United States Patent [19]

Ito

[11] Patent Number: 4,823,195
[45] Date of Patent: Apr. 18, 1989

[54] RECORDING APPARATUS

[75] Inventor: Yoshio Ito, Tokyo, Japan

[73] Assignee: Canon Kabushiki Kaisha, Tokyo, Japan

[21] Appl. No.: 929,617

[22] Filed: Nov. 12, 1986

[30] Foreign Application Priority Data

| Nov. 15, 1985 | [JP] | Japan | 60-254924 |
| Dec. 12, 1985 | [JP] | Japan | 60-277959 |
| Dec. 12, 1985 | [JP] | Japan | 60-190345[U] |
| Dec. 12, 1985 | [JP] | Japan | 60-190346[U] |
| Dec. 27, 1985 | [JP] | Japan | 60-292974 |
| Dec. 27, 1985 | [JP] | Japan | 60-292975 |
| Jan. 14, 1986 | [JP] | Japan | 61-4293 |
| Jan. 14, 1986 | [JP] | Japan | 61-4294 |
| Jan. 30, 1986 | [JP] | Japan | 61-11030[U] |
| Jan. 31, 1986 | [JP] | Japan | 61-18116 |
| Sep. 10, 1986 | [JP] | Japan | 61-211495 |

[51] Int. Cl.$^4$ .................. H04M 1/04; H04N 1/21
[52] U.S. Cl. .................... 358/285; 358/293; 358/296
[58] Field of Search ............. 358/256, 286, 293, 285, 358/296

[56] References Cited

U.S. PATENT DOCUMENTS 3,937,872 2/1976 Kondo et al. .................. 358/256
4,564,864 1/1986 Maeshima ..................... 358/280
4,638,368 1/1987 Shimizu et al. ................ 358/256

FOREIGN PATENT DOCUMENTS 58-22353 5/1978 Japan.
54-16116 2/1979 Japan ........................... 358/286
60-16763 1/1985 Japan.

Primary Examiner—Edward L. Coles, Sr.
Attorney, Agent, or Firm—Fitzpatrick, Cella, Harper & Scinto

[57] ABSTRACT

This invention relates to a recording apparatus having a function for reading data on an original, and a function for recording an image corresponding to read data. The recording apparatus of this invention has: an original read unit for reading data on an original; a record unit for recording an image corresponding to the data read by the original read unit on a recording medium; a device for reciprocating the original read unit and the record unit in a main scan direction; and a feed unit for synchronously feeding the original and the recording medium in a sub-scan direction. The original read and record units are moved in the main scan direction, and the original and the recording medium are synchronously fed in the sub-scan direction to record an image corresponding to the data on the original on the recording medium.

25 Claims, 55 Drawing Sheets

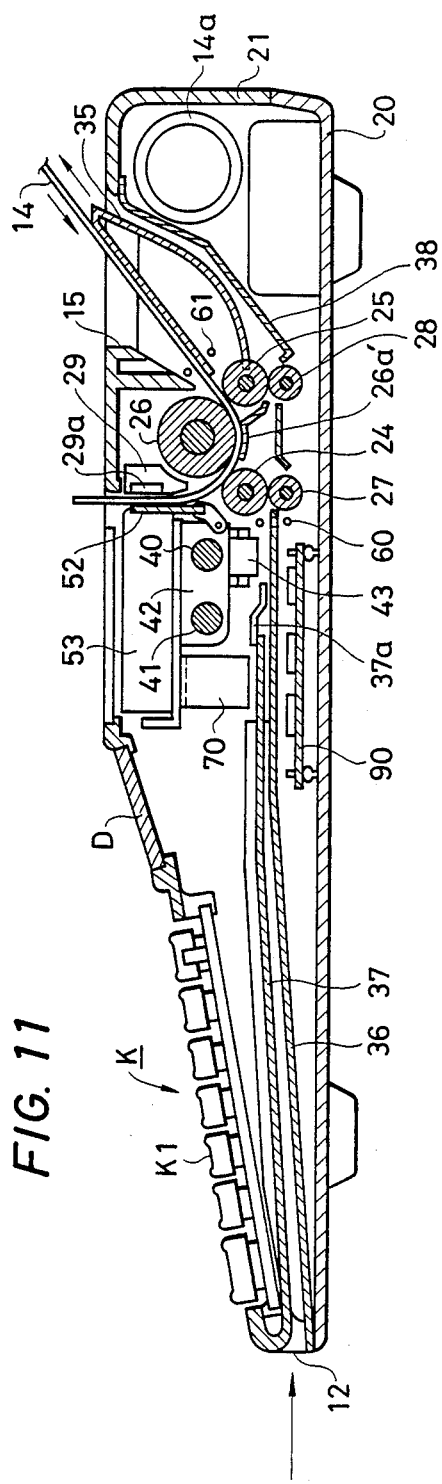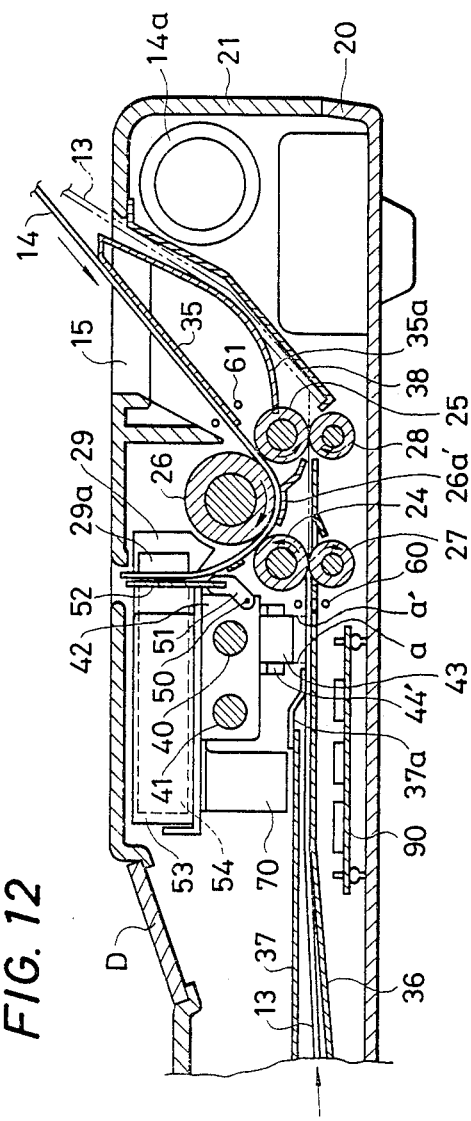

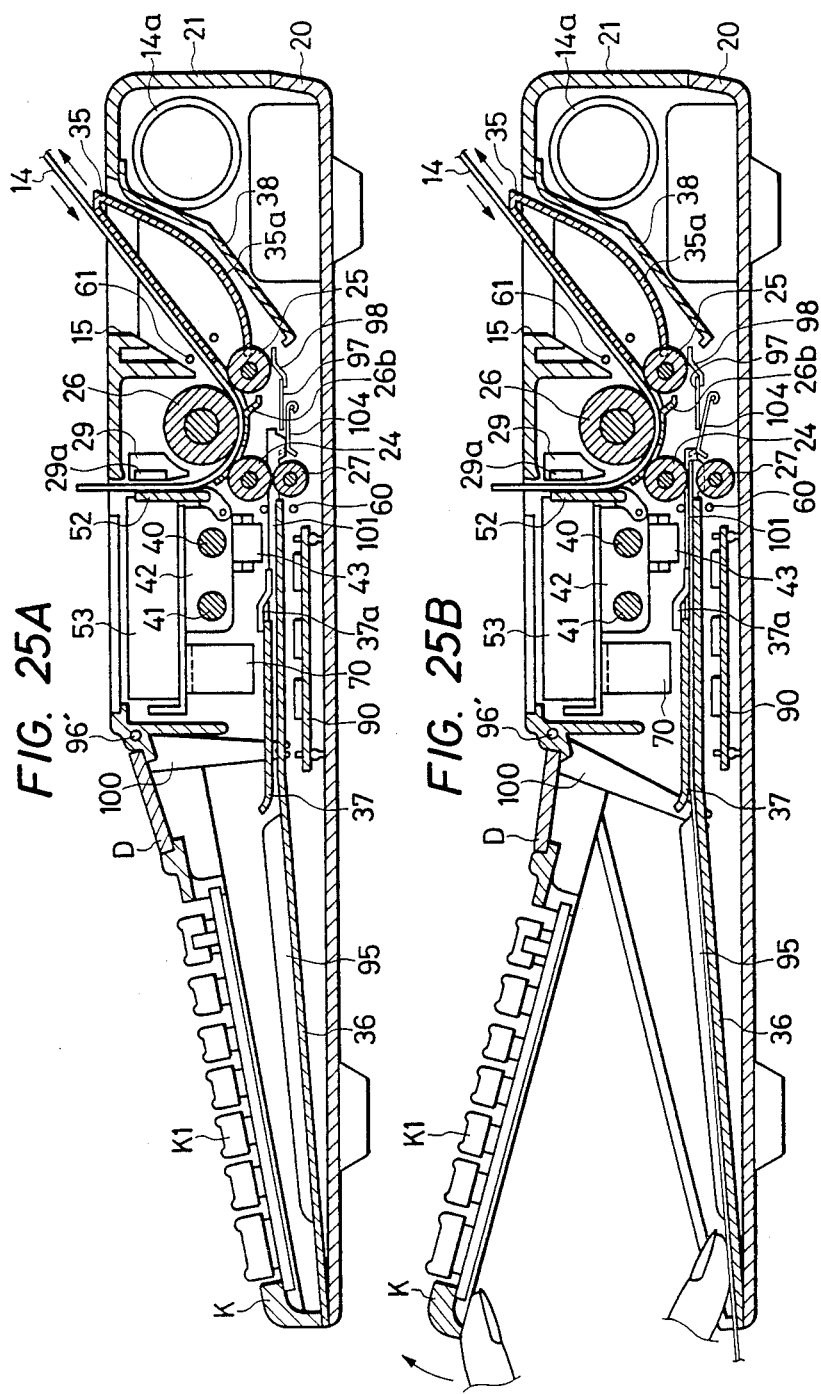

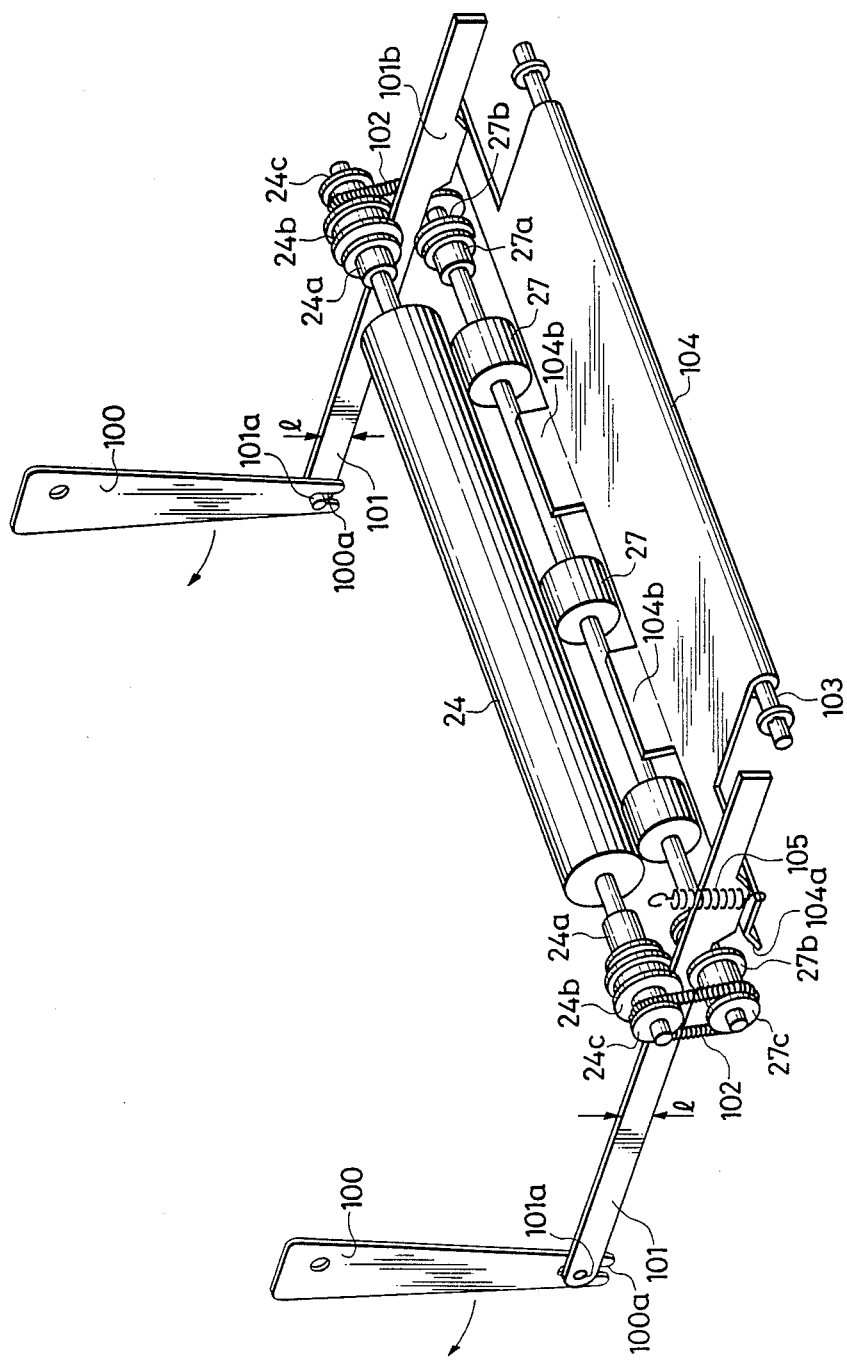

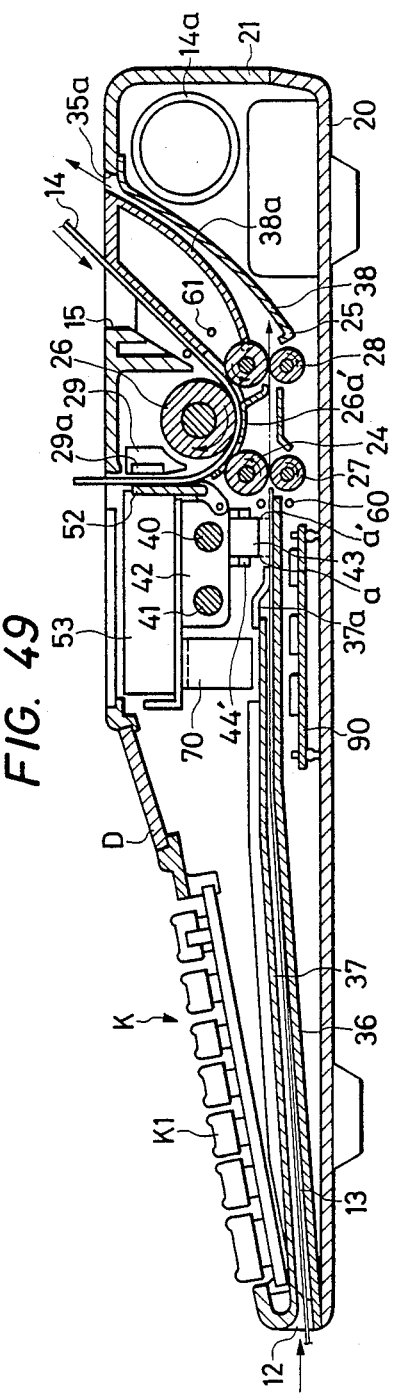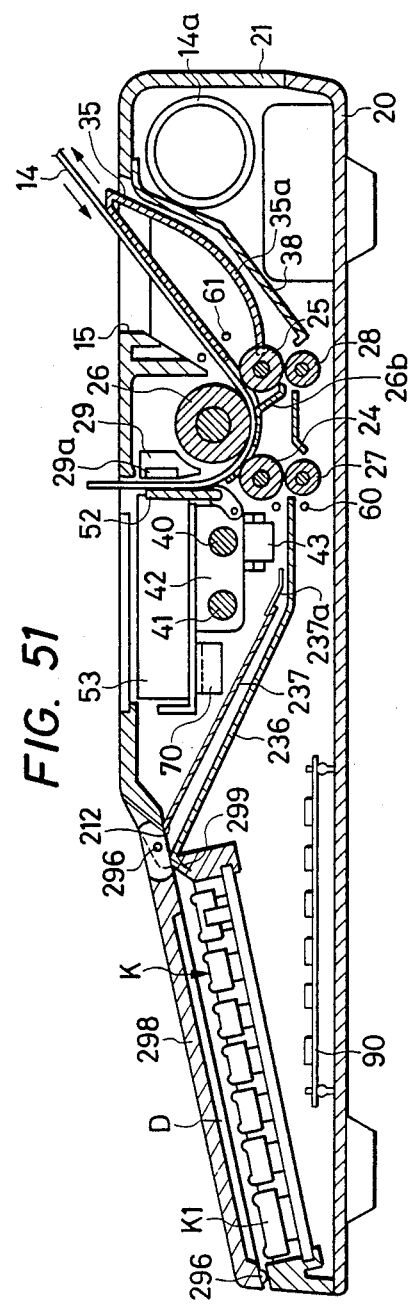

RECORDING APPARATUS

BACKGROUND OF THE INVENTION

1. Field of the Invention

The present invention relates to a recording apparatus which has a function for reading data and a function for recording an image corresponding to the read data.

The present invention can be applied to, e.g., a copying machine, an electronic typewriter, a wordprocessor, a facsimile system, or the like.

2. Related Background Art

As a conventional apparatus having a function for reading and recording an original image, a facsimile system or a digital copying machine is known. The facsimile system or the digital copying machine has separate read and record units. In the read unit, data corresponding to a sheet width of an original is temporarily read by beam optically reduced it by a line sensor, and is converted into a digital signal to read original data. In a recording mode, in the facsimile system a recording operation is performed for each line by a line head. In the digital copying machine, latent image data is formed on a photosensitive drum by laser scanning or a liquid-crystal shutter and is developed by toner. Thereafter, the toner image is transferred and fixed to perform the recording operation. In this case, in some recording apparatuses, the read unit and the record unit are not separately provided but are integrated.

For example, Japanese Utility Model Publication No. 22353/1983 describes a facsimile system which reads an original using a line sensor, and performs a recording operation using a line head. In this utility model, a common convey roller for conveying an original and a back surface of a recording sheet to be in contact with the single roller is disclosed.

In this case, since the line reading/recording operation is performed, no flat portion is required for a reading/record unit, and the outer periphery of the roller can be used as a reading/recording surface, thus allowing the use of the common convey roller.

Another apparatus is known which does not perform reading/recording operation by means of a line sensor or a line head, but in which a read unit and a record unit are mounted on a carriage and the carriage is reciprocated (along the main scan direction), and a recording sheet is fed in a sub-scan direction to perform a recording operation. In this case, in the typical recording operation, original data is read using a recording sheet feed mechanism and is temporarily stored in a memory. Subsequently, a recording sheet is inserted, and the data stored in the memory is read out by a record unit, thus performing the recording operation. Since a memory having a large capacity cannot be mounted, only a small amount of data can be read.

Japanese Patent Disclosure No. 16763/1985 discloses an apparatus which reads an original image by two-dimensional scanning to perform a recording operation. A recording sheet is conveyed in synchronism with the original to perform a reading/recording operation. In this case, a convey unit for the recording sheet and that for the original are not commonly used but are independently provided.

SUMMARY OF THE INVENTION

It is an object of the present invention to provide a recording apparatus which can obtain a good recording image.

It is another object of the present invention to provide a thin recording apparatus having a high operability.

It is still another object of the present invention to provide a recording apparatus which can reliably convey an original and a recording medium in synchronism with each other.

It is still another object of the present invention to provide a portable recording apparatus having a key input means, e.g., a typewriter, having both a recording means and a copying means.

It is still another object of the present invention to provide a recording apparatus in which an original can be set at a predetermined position when the original is inserted and an operator can easily and properly perform an inserting operation for a reading operation.

It is still another object of the present invention to provide a recording apparatus which can prevent an insertion error of an original or a recording sheet.

According to the present invention, these objects are obtained in part by the provision of a recording apparatus having reading means, recording means, means for reciprocally and integrally moving the reading and the recording means in a direction crossing a conveyance path. of the original and of the recording medium, respectively, and common conveying means for commonly conveying the original and the recording medium simultaneously along their respective conveyance paths.

According to another aspect of the invention, these objects are attained at least in part by provision of a recording apparatus having key input means, an original reading means, recording means and a feed path arranged below the key input means for feeding an original to be read by the reading means.

According to another aspect of the invention, the foregoing objects are attained at least in part by provision of an image reading apparatus having an optical system for imaging a reflected optical image of an original, a reading sensor for reading the optical image, moving means for moving the optical system and the reading sensor for reading, and means for following movement of the optical systems to move the optical system along, and at a predetermined distance from, an original surface on which the original is placed for reading.

According to another aspect of the invention, these objects are attained at least in part by provision of a recording apparatus having reading means, recording means, and means for reciprocally moving the reading and the recording means, and in which the original reading means includes a board mounting a reading lens whose optical access extends substantially perpendicular to an original surface and a reading sensor, and which board is arranged substantially parallel to the optical axis. Optical path changing means guides a light beam from the reading lens onto the reading sensor.

Another aspect of the invention is attained at least in part by provision of a recording apparatus having key input means, original reading means, recording means and an original insertion port arranged behind the key input means.

The foregoing and other objects, features and advantages of the present invention will be understood more fully from a consideration of the following detailed description of the preferred embodiments taken in conjunction with the accompanying drawings.

BRIEF DESCRIPTION OF THE DRAWINGS

FIGS. 1 to 9 show a recording apparatus according to an embodiment of the present invention, in which FIG. 1 is a perspective of the recording apparatus, FIG. 2 is a sectional view showing the internal arrangement of the recording apparatus, FIG. 3 is a front view showing the internal arrangement of the recording apparatus, FIG. 4 is a perspective showing the arrangement of a carriage, FIG. 6 is a diagram showing the arrangement of a read unit, FIG. 7 is a representation for explaining a recording operation, FIG. 8 is a flow chart showing a control sequence, and FIG. 9 is a sectional view showing another embodiment of a convey system;

FIGS. 10 to 23 show a recording apparatus according to another embodiment of the present invention, in which FIG. 10 is a perspective view showing an outer appearance of the recording apparatus, FIG. 11 is a sectional view showing the internal arrangement, FIG. 12 is a detailed sectional view of the internal arrangement, FIG. 13 is a diagram showing an electrical circuit, FIG. 14 is a block diagram for explaining the operation in a typewriter mode, FIG. 16 is a block diagram in a copying machine mode, FIG. 17 is a flow chart showing a control sequence, FIGS. 18 and 19 are sectional views showing another embodiment of an original insertion unit, FIG. 20 is a perspective view of an original guide unit, FIG. 21 is a sectional view showing still another embodiment of the original insertion unit, and FIGS. 22 and 23 are a perspective view and a sectional view showing still another embodiment of the original insertion unit;

FIGS. 24 to 27B show a recording apparatus according to still another embodiment of the present invention, in which FIG. 24 is a perspective view showing an outer appearance of the recording apparatus, FIGS. 25A and 25B are sectional views showing the internal arrangements respectively when a keyboard is closed and opened, FIG. 26 is a perspective view showing the main part of a mechanism for moving an original positioning means, and FIGS. 27A and 27B are views for explaining the operation of the mechanism;

FIGS. 28 to 31 show a recording apparatus according to still another embodiment of the present invention, in which FIG. 28 is a cross-sectional view of an image read unit of a reading/recording apparatus applicable to the present invention, FIG. 29 is a cross-sectional front view showing the image read unit of the apparatus shown in FIG. 28, and FIGS. 30 and 31 are views for explaining the reading operation;

FIGS. 32 to 36 show a recording apparatus according to still another embodiment of the present invention, in which FIG. 32 is a cross-sectional side view around a read unit of a recording apparatus with a copying function employing the present invention, FIG. 33 is a cross-sectional front view showing the read unit of the apparatus shown in FIG. 32, FIGS. 34 and 35 are views for explaining the reading operation, and FIG. 36 is a view for explaining the positional relationship between a lens, a sensor, and a roller;

FIGS. 37 to 40 show a recording apparatus according to still another embodiment of the present invention, in which FIG. 37 is a cross-sectional side view of the apparatus, FIG. 38 is a cross-sectional front view of the apparatus shown in FIG. 37, and FIGS. 39 and 40 are views for explaining the reading operation;

FIGS. 43 to 46 show a recording apparatus according to still another embodiment of the present invention, in which FIG. 43 is a sectional view showing the internal arrangement of the apparatus, FIG. 44 is a front view showing the internal arrangement shown in FIG. 43, FIG. 45 is a perspective view showing the arrangement of a carriage, and FIG. 46 is a diagram showing the arrangement of an electrical circuit;

FIG. 49 is a sectional view of a recording apparatus to which still another embodiment is applied; and FIGS. 50 to 52 show a recording apparatus according to still another embodiment of the present invention, in which FIGS. 50 is a perspective of the outer appearance of the apparatus, and FIGS. 51 and 52 are sectional views showing the internal arrangements respectively when a cover is closed and opened.

DETAILED DESCRIPTION OF THE PREFERRED EMBODIMENTS

The preferred embodiments of the present invention will be described in detail with reference to the accompanying drawings.

Figure 1:
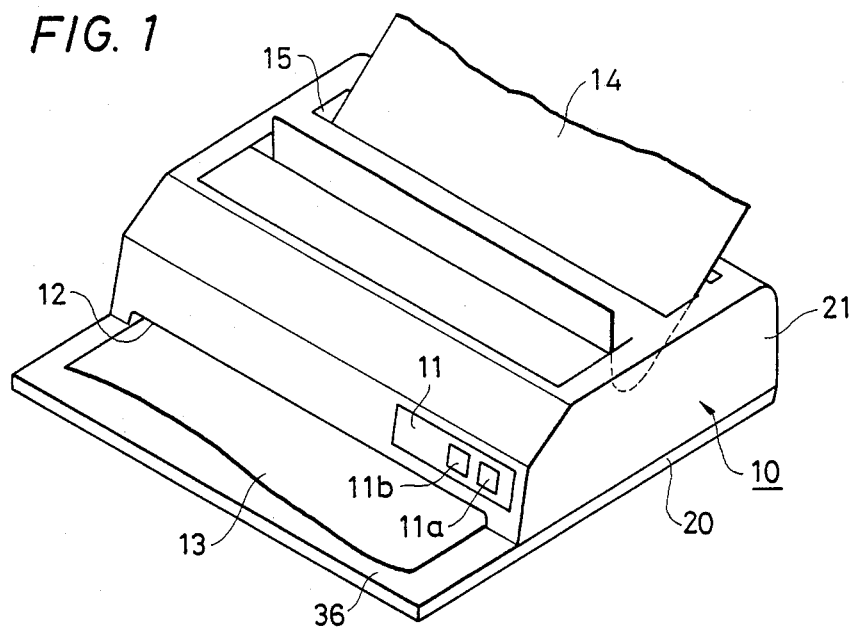

FIGS. 1 to 5A and 5B show a recording apparatus according to an embodiment of the present invention. An operation unit 11 having a power source switch 11a and an operation switch 11b is arranged on the front surface portion of a casing 10 of the recording apparatus. An original insertion port 12 for inserting an original 13 therethrough and a recording sheet insertion port 15 for inserting a recording sheet 14 therethrough are formed respectively in the front and rear end portions of the casing 10 (FIG. 1).

The arrangement of a convey system for the original 13 and the recording sheet 14 will now be described.

As shown in FIGS. 2 to 5A and 5B, side plates 22 and 23 are arranged in the casing 10 of the recording apparatus constituted by a base 20 and an outer casing 21. Main rollers 24 and 25 are rotatably supported by the side plates 22 and 23, so as to be in a substantially horizontal state and to be separated from each other by a small distance. A platen roller 26 is urged against the main rollers 24 and 25 from the above. Lines connecting the central axes of the respective rollers 24 to 26 form a triangle, and two sides of the triangle passing through the contacting points between the platen roller 26 and the main rollers 24 and 25 are inclined. Normals to these contacting points correspond to the convey directions of the recording sheet 14 when the rollers are rotated. As can be seen from FIGS. 5A and 5B, three rollers 24, 26, and 27 are coupled to a sub-scan motor (pulse motor) 30 through gears 24a, 26a, and 27a to be capable of synchronous driving at the same peripheral velocity. The outer peripheral surface of the platen roller 26 is located at a position slightly higher than the lower outer peripheries of the two main rollers 24 and 25.

Figure 2:
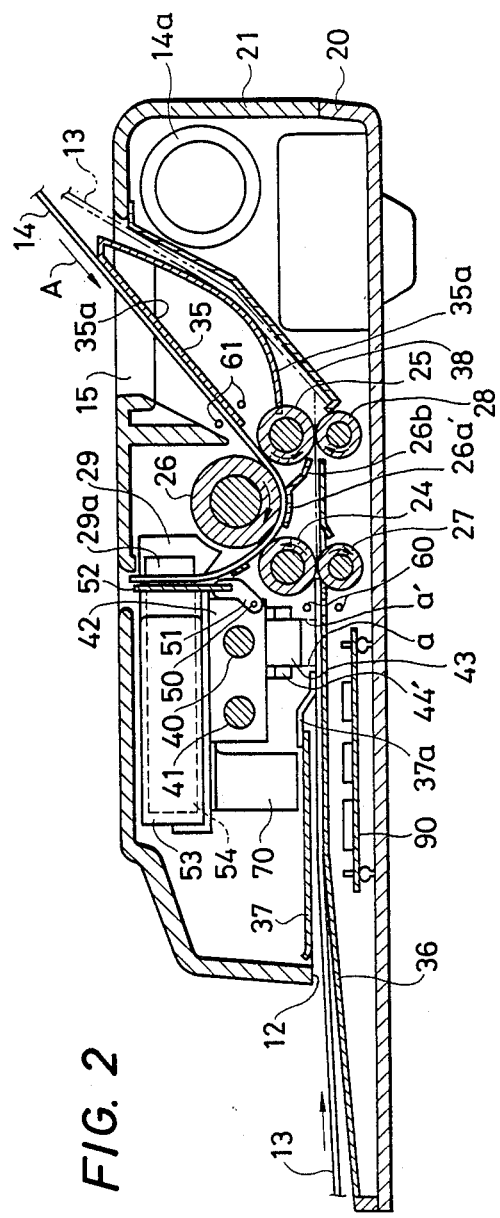

A guide member 35 for the recording sheet 14 is arranged along an inclined surface 35a, as shown in FIG. 2, and is fixed to the side plates 22 and 23. The recording sheet 14 is inserted from the above in the direction indicated by arrow A, and is introduced in the tangential direction of the platen roller 26 and the main roller 25. Then, the sheet 14 is curved in a U shape along the platen roller 26 and is then conveyed upward by the rollers 24 and 26. In this case, the recording sheet 14 passes through a gap between an elastic member 29a on a flat platen 29 and a record head 52 along the surface of the elastic member 29a, and is stopped at a position illustrated in FIG. 2 to be subjected to a recording operation (to be described later). In this manner, the recording sheet 14 is fed downward along an inclined surface allowing easy insertion, is U-turned along the radius of curvature of the platen roller 26, and is then conveyed upward while being inclined. Thus, a thick recording medium, e.g., a post card, can be smoothly guided and fed.

Driven rollers 27 and 28 are arranged below the main rollers 24 and 25 to be parallel to each other while keeping an urging state necessary for a sheet conveying operation. The original 13 is clamped between the main rollers 24 and 25 and the driven rollers 27 and 28 to be conveyed horizontally, as shown in FIG. 2. The gear 24a of the main roller 24 is meshed with the gear 27a of the driven roller 27 so as to feed the original 13 between the rollers 24 and 27 without slippage. The original 13 receives a feed force at its back surface through the gear 27a, thus assuring a reliable sheet feed operation.

All the roller axes described above are parallel to each other, and are driven by the sub-scan motor 30. The flat platen 29 parallel to the platen roller 26, and the elastic rubber member 29a having a flat surface with respect to the record head 52 are integrally supported by the side plates 22 and 23 above and near the platen roller 26.

Upper and lower original guide plates 37 and 36 are horizontally arranged along the vicinity of the contacting surface of the driven rollers 27 and 28 respectively contacting the main rollers 24 and 25. The original 13 is guided in a direction opposite to that of the recording sheet 14 along the guide plates 36 and 37. A notch portion 26a' is partially formed in the lower portion of the guide member 35, so that the rollers 24 and 26 can be in contact with each other through this notch portion 26a'. The notch portion 26a' is bent downward to be a bent portion 26b, serving as a guide portion for guiding the original 13 between the next rollers 25 and 28. The original 13 guided by the upper and lower guide plates 36 and 37 is clamped by the rollers 24 and 27 and the rollers 25 and 28 to be guided along a bent portion 35a of the guide member 35, and is then stocked on a tray 38, as indicated by dotted lines in FIG. 2. In this manner, since the original is guided and fed substantially horizontally, it can be a thin letter but can also be a thick letter, thus allowing a feed operation of any type of originals.

The horizontally fed original receives a spring recover effect by means of an inclined discharge path and can be satisfactorily discharged with a simple arrangement. In this case, the original 13 can be discharged upward but can instead be guided to the rear portion.

In order to guide the original to the read unit and in the tangential direction of the rollers 24 and 27 without floating, a weak spring 37a which will not interfere with insertion of the original is mounted.

A sensor 60 for detecting the presence/absence of the original 13 is arranged between the distal end portion of the lower guide plate 36 and the rollers 24 and 27. A sensor 61 for detecting the presence/absence of the recording sheet 14 is arranged below the recording sheet guide member 35. These sensors can be realized by mechanical sensors, e.g., microswitches, or photosensors, e.g., photointerrupters.

The original 13 is inserted in a path defined by the upper and lower guide plates 37 and 36 until it abuts between the main roller 24 and the driven roller 27. Since the sensor 60 is arranged immediately before the rollers 24 and 27, proper insertion of the original can be detected. The recording sheet 14 is inserted from the recording sheet insertion port 15 in the direction opposite to the feed direction of the original 13 in order to record the original image, as will be described later, and its proper insertion is detected by the sensor 61. In this case, the main roller 24 serves to feed both the original and the recording sheet. Note that a battery 14a in FIG. 2 can supply power to the respective units by operating the power source switch 11a. Therefore, the apparatus of this embodiment can be used as a portable apparatus.

A read unit and a record unit will be described below.

Figure 4:
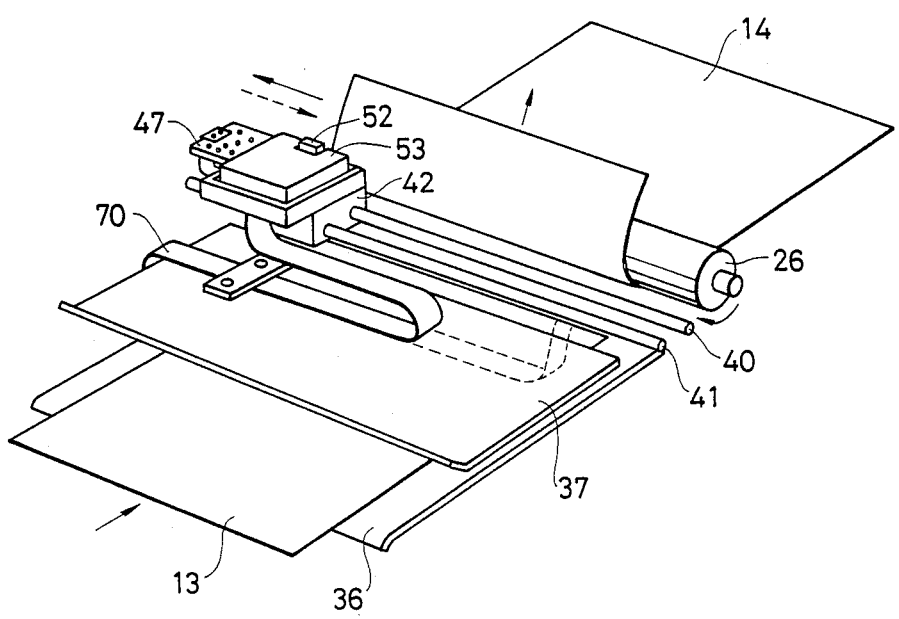
Figure 3:
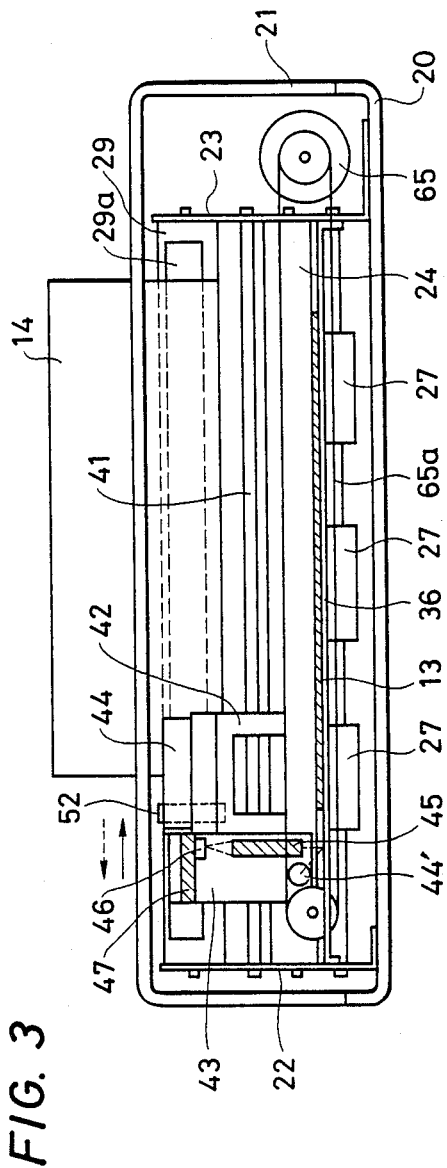

As shown in FIGS. 3 and 4, rails 40 and 41 are arranged between the side plates 22 and 23, and a carriage 42 is guided to be reciprocal in the main scan direction through a belt 65a by a main scan motor 65 to be parallel to the platen roller 26 along the rails 40 and 41. A read unit 43 for reading an image and a record unit 44 for recording an image are arranged integrally with the carriage 42 to be adjacent to each other.

The read unit 43 comprises an original illumination light source 44', a focusing optical lens 45, a read line sensor 46, and a photo-electric converter 47. The read unit 43 scans a range a—a' (FIG. 2) of the original 13 having data facing upward in the main scan direction to read data at a given density, performs photo-electric conversion, and sends image data to the record unit. The read line sensor 46 comprises a focusing optical lens 45 (SELFOC lens; tradename of Nippon Sheet Glass Co., Ltd.), and an equal-magnification contact sensor 46. Alternatively, as shown in FIG. 6, the sensor 46 can comprise a CCD 71 which detects a reduced image using a cylindrical lens.

Figure 6:
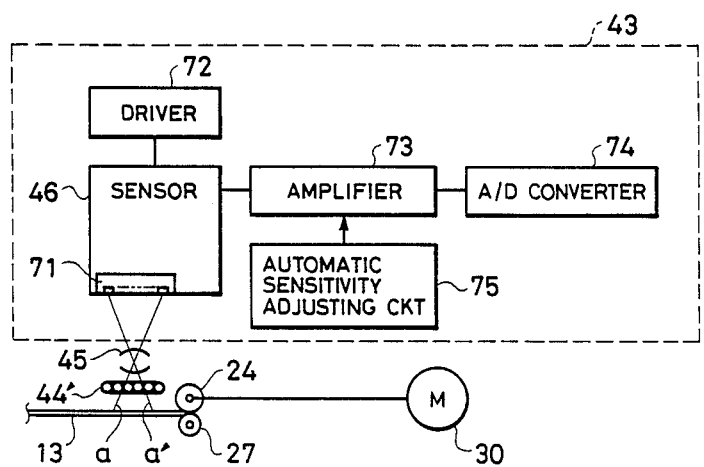
Figure 7:
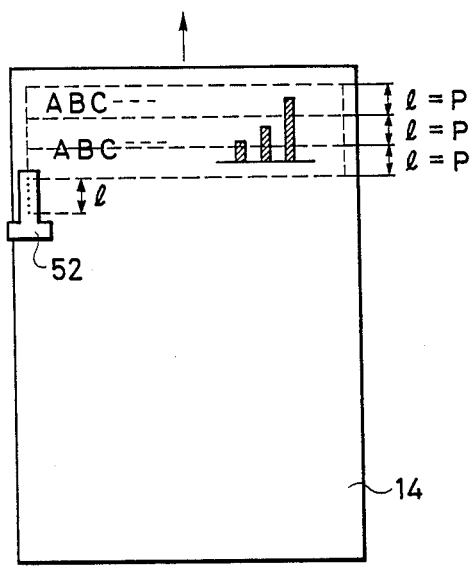

In FIG. 6, a signal read by the CCD 71 is driven by a driver 72, and is sequentially read to be amplified by an amplifier 73. The amplified signal is read out as a digital signal through an A/D converter 74. The amplifier 73 is connected to an automatic sensitivity adjusting circuit 75 to automatically adjust the gain.

The record unit 44 has the record head 52 which is mounted on a holding member 51, which is swingable about a fulcrum 50. The record head 52 has a plurality of heating elements arranged in a matrix in the sub-scan direction. A cassette 53 incorporates an thermal transfer ribbon 54. The end portion of the ribbon 54 having an ink layer is wound around a takeup bobbin in the cassette 53 via the surfaces of the elements of the record head 52 (FIG. 2).

Figure 5A:
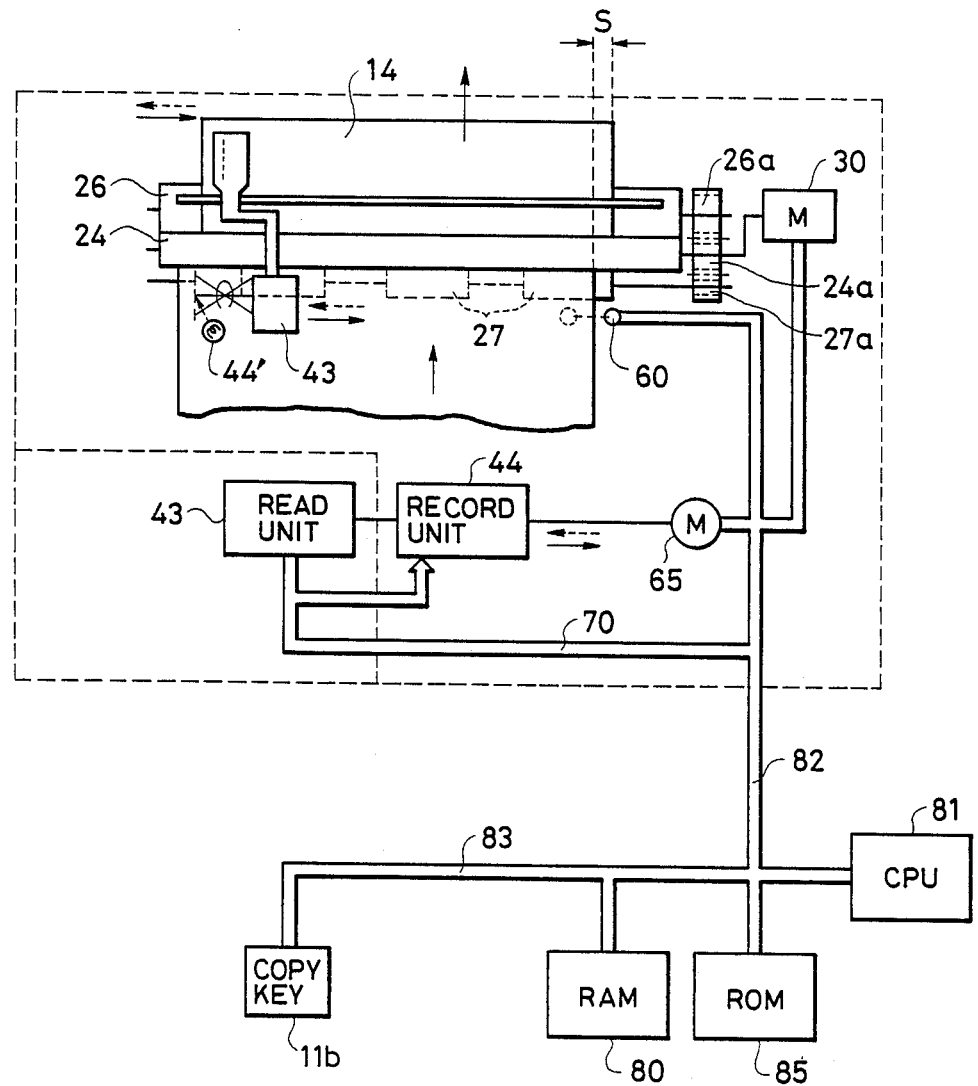
FIGS. 5A is a diagram showing the arrangement of an electrical circuit.

A signal read by the read unit 43 is input to a RAM (Random Access Memory) 80 through a signal cable 70, as shown in FIGS. 4 and 5A, and is subjected to signal processing under the control of a CPU (Central Processing Unit) 81. The CPU 81 receives a signal from the sensor 60 through a signal cable 82, and controls the main scan and sub-scan motors (step motors) 65 and 30 therethrough. Similarly, the CPU 81 is connected to the operation key 11b and a ROM (Read-Only Memory) 85 through a signal cable 83. The record unit 44 is connected to the CPU 81 through the signal cables 70 and 82. The electronic circuit is arranged on a circuit board 90 in the lower portion of the apparatus.

In this embodiment, the read unit 43 and the record unit 44 are arranged on the carriage 42 to be shifted from each other. For example, as shown in FIGS. 3 and 5A, since the record head 52 is located on the right side and the read surface of the read unit is located on the left side, the original 13 and the recording sheet 14 are positioned to be shifted by a distance S corresponding to the above-mentioned shifting in the main scan direction. Thus, the reading and recording operations can be performed at the same time.

Since a read optical system can be arranged adjacent to the rollers 24 and 27, the reading operation is allowed from the distal end portion of the original.

Note that the read and record units are flat portions as indicated by the range a—a' (FIG. 2) and the flat platen 29 in order to perform satisfactory image reading and recording operations in the main scan direction.

The operation of the recording apparatus according to the embodiment of the present invention will now be described hereinafter.

As shown in FIG. 2, the recording sheet 14 is inserted between the platen roller 26 and the main roller 25 serving as a first carrier from the recording sheet insertion port 15 formed in the upper rear portion of the apparatus. When the rollers are rotated in the direction indicated by arrow by a rotary knob (not shown), the recording sheet 14 is fed in a path defined by the platen roller 26 and the bent portion 26b in a U-turn manner, and is moved forward between the platen roller 26 and the main roller 24 to be guided along the guide member extending forward. The sheet 14 is then discharged outside the apparatus through a gap between the record head 52 and the flat platen 29.

In order to easily adjust the distal end of the sheet to be located slightly above the record head 52, an index (not shown) can be formed on an upper cover of the apparatus, thus positioning the sheet. If the sheet passes over the predetermined position, the rotary knob can be rotated in the reverse direction to correct it. In this case, all the rollers 24 to 28 are rotated while they are in contact with each other, urged against each other, or coupled through gears without slipping.

In this manner, the distal end of the recording sheet 14 is moved in accordance with the rotating angle of the platen roller 26 upon rotation of the knob and is stopped at a desired position. During this operation, since no original is inserted, the rollers 27 and 28 for feeding and discharging the original are simply idled during normal and reverse rotations. The sensor 61, arranged below the guide member 35, for detecting the presence/absence of the recording sheet can prevent an erroneous recording operation while no original is inserted, thus preventing the elastic member 29a from being contaminated with ink.

Figure 8:
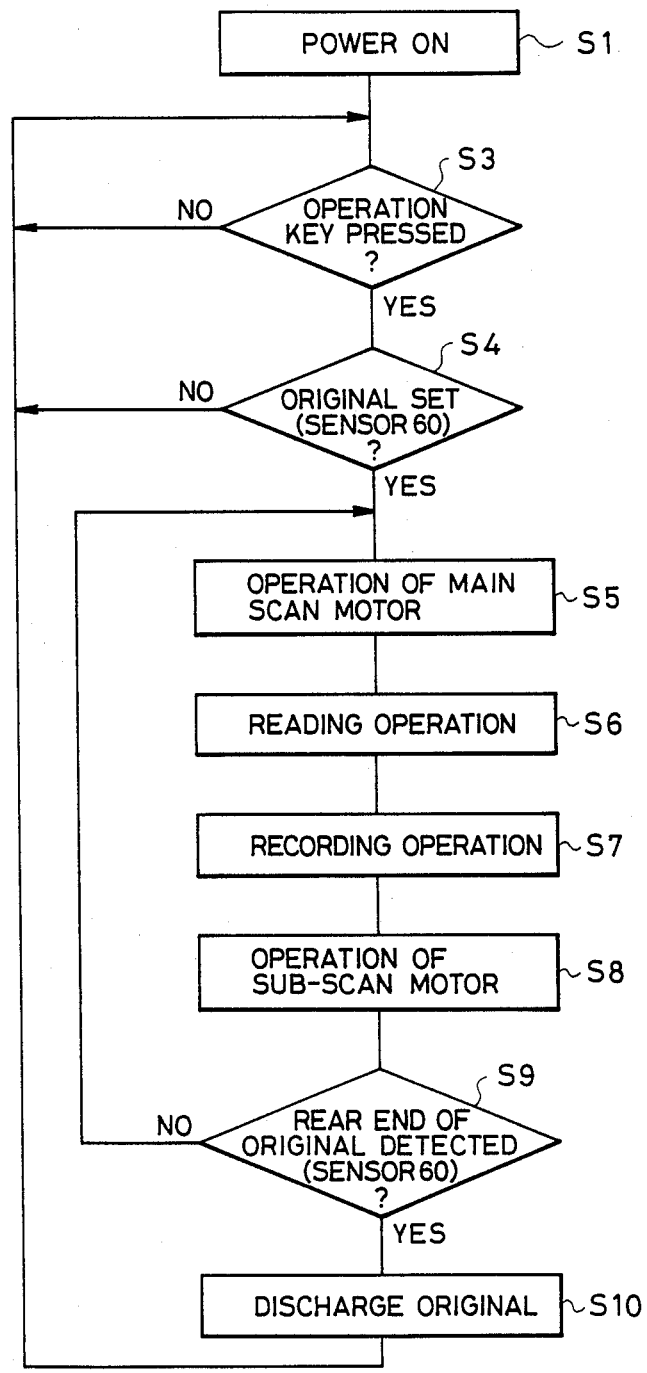

After the distal end of the recording sheet 14 is set at a specified position passing by the record head 52, the power source is turned on as shown in steps S1 and S3 in FIG. 8, and the operation key 11b (FIG. 1) is then operated to set the original 13, as shown in step S4. In this case, the original 13 is moved forward with its character data surface facing upward by a manual operation along the guide plates 36 and 37 from the original insertion port 12 up to a read enable area, and is inserted until it is in contact with the main roller 24 and the driven roller 27. This position is detected by the sensor 60. It is preferable that the distance from one end a' (FIG. 2) of prospective optical read length a—a' to the distal end of the inserted original 13 be substantially equal to the distance from the distal end of the recording sheet 14 to a dot start point of the record head 52. In this case, since the read optical system can be arranged immediately before the rollers 24 and 27, the distal end portion of the original can be read.

In this manner, when insertion of the original 13 is detected by the sensor 60, a circuit operated when an original is present is selected to start the reading operation.

Upon starting of the operation, the original illumination light source 44' is turned on and the reading operation is started under the control of the CPU 81. The read optical system of the read unit 43 is moved stepwise in the main scan direction by the main scan motor 65 (step S5). The original 13 is illuminated by the light source 44', and reflected light is focused on the line sensor 46 through the lens 45, thus starting the reading operation (step S6). Accumulated analog data from the line sensor 46 is read out for each pixel in synchronism with stepwise movement, and is amplified by the amplifier 73 through the automatic sensitivity adjusting circuit 75. The amplified signal is converted to a digital signal by the A/D converter 74, thus photo-electrically converting image data of an object. At this time, a memory, e.g., a line buffer, can be prepared to store the data for image processing, if necessary. The operation control of the CPU 81 is executed by a program stored in the permanent memory (ROM) 85. The read signal is supplied to the record unit 44, and the recording operation is performed in synchronism with the stepwise movement (step S7). In this case, if a plurality of high-luminance LEDs are linearly arranged on the illumination light source 44' adjacent to the two-dimensionally read original and the read unit comprises a wide angle, short focal length lens or a bright SELFOC multi-eye lens having an F number exceeding 2 and a small Tc value, the reading operation can be performed at a relatively high speed. In order to output data from the record head 52 at the same time when the data is read, the reading and recording operations must be synchronously performed, and the recording speed is preferably improved. The number of pixels of the read line sensor 46 is set to be at least equal to or more than the number of record dots of the recording head 52. Image signals of an object read by a large number of sensor bits can improve the reading resolution. When the signals are ANDed or ORed to correspond to the number of dots of the record head, a fine, high-quality copy with almost no image error can be obtained.

Note that a feed pitch P of the original 13 and the recording sheet 14 which are intermittently fed in the sub-scan direction is determined by the total length (l) of the elements of the recording head 52, and cannot exceed this. This is because image data on an object is not limited to characters in the column direction but can be a continuous image, e.g., a figure. Therefore, read or record errors must be eliminated.

In this manner, a signal read by the reciprocal scanning (main scanning) operation of the read unit 43 is supplied to the record head 52, and the recording operation is performed at substantially the same time. The original 13 and the recording sheet 14 are then intermittently fed at the pitch P to perform the reading and recording operations by the main scan operation. When this operation is repeated in the longitudinal, feed direction of the original 13, the recording operation can be performed (steps S7 and S8). Note that in order to perform the original reading and recording operations at the same time, the feed directions of the original and the recording sheet are opposite to each other in the sub-scan direction.

When the rear end of the original is detected by the sensor 60 (step S9), the main scan operation of the original is ended, and the optical system and the record head 52 are returned to their home positions. At the same time, the sub-scan motor 30 is driven until the original 13 and the recording sheet 14 are free from the rollers to effect discharge of the original 13, thus ending the operation (step S10).

In this manner, the sensor 60 is used for obtaining a signal for starting and ending the recording operation.

Figure 5B:
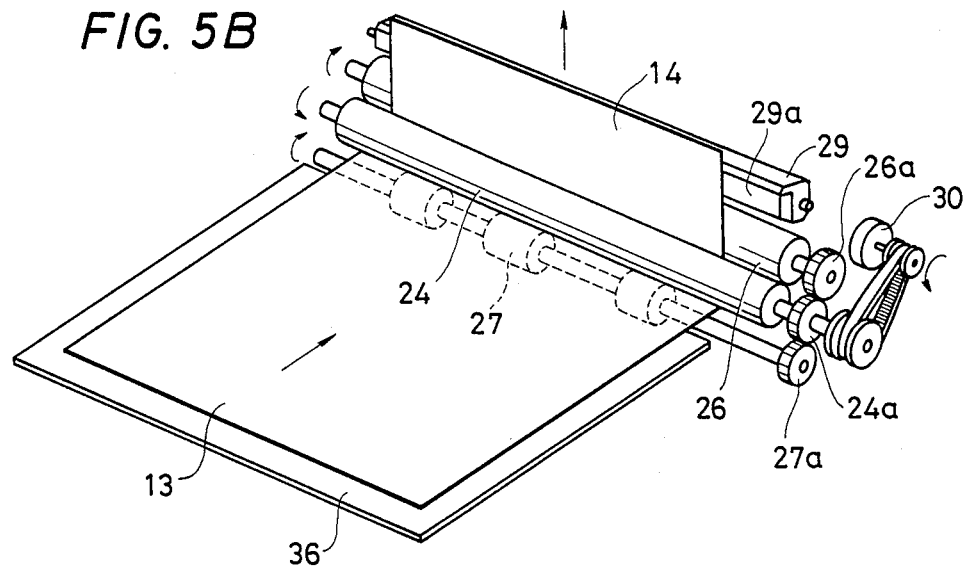
FIG. 5B is a perspective view of a roller driving system.

As described above, in this embodiment, the main roller 24 has both the function for feeding the original 13 and the function for feeding the recording sheet 14. The platen roller 26 and the driven roller 27 cooperating with the main roller 24, the main roller 25 and the driven roller 28 are operated integrally. In this case, if the rollers 24, 26, and 27 not only have a simple urging structure but also are connected through the gears 24a, 26a, and 27a, as shown in FIG. 5B, the feed precision in the sub-scan direction can greatly improved without slippage. Therefore, an error between the feed pitches P of the original and the recording sheet can almost be eliminated, thus improving the quality of the recorded image. More specifically, as shown in FIG. 5B, since the original and the recording sheet are integrally fed by the outer periphery of the common roller 24, no backlash generated by gear coupling occurs, when compared to a case when sheets are fed synchronously by separated roller pairs. In addition, the original and the recording sheet will not be shifted from each other while being conveyed, and hence their oblique movement can be eliminated, thus allowing an accurate synchronous feed operation.

The driven roller 28 can be coupled to the main roller 25 through a gear without being simply urged thereagainst, thus assuring further reliable integral rotation.

In this manner, in the main scan direction, the reading and recording operations are performed on the flat portion, and in the sub-scan direction, the original and the recording sheet can be completely synchronously fed, thus allowing high-quality image recording.

In this embodiment, since the feed mechanism is commonly used for the original and the recording sheet as much as possible, a thin, compact apparatus can be realized.

In the recording apparatus of this embodiment, various improvements for realizing a thin, compact apparatus are made. For example, in order to simultaneously perform the reading and recording operations, the original to be read and the recording sheet must be at positions shown in FIG. 2. For this purpose, the optical system is arranged adjacent to the record head 52 to preserve a mechanism space necessary for recording.

In this case, if the illumination light source 44' and the lens system 45 are arranged in the vicinity of the surface of the original 13, the sensor 46 is arranged thereabove, and the highest position of the photo-electric converter 47 is at the same level as that of the cassette 53, a thin arrangement like that of this embodiment can be realized. In this case, the short focal length (wide angle) lens is preferably used in the optical system.

The outer periphery of the common main roller 24 and the guide surface 29a for recording are linearly extended to be substantially perpendicular to each other. Meanwhile, the guide surface and the original read surface define a space at a substantially right angle. The read optical system can be arranged at a deep position in the right-angled space, thus realizing a thin apparatus.

In this embodiment, the pairs of main rollers and driven rollers are arranged to sandwich the platen roller 26 therebetween, thus allowing a smooth original feed operation. In addition, since the platen roller can be arranged between the respective pairs of rollers, a thin apparatus can be realized.

Figure 9:
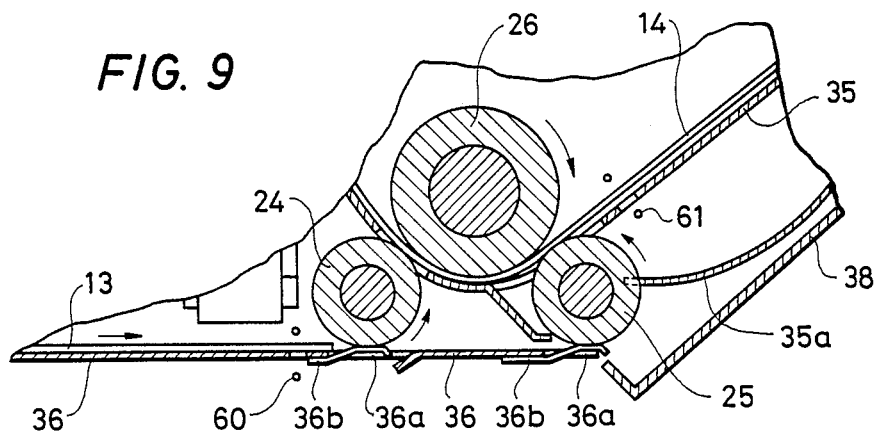

As shown in FIG. 9, a notch portion 36a is formed in the lower guide plate 36, and weak elastic members 36b are mounted on the lower guide plate 36 to face the notch portion 36a, so as to provide the function of the driven rollers 27 and 28. In this case, a still thinner apparatus can be realized.

The above-mentioned recording apparatus is not limited to a facsimile system or a digital copying machine, but can be applied to various other recording apparatus which can record input data from a separate input device, e.g., a keyboard, or an integrally provided keyboard through a record unit.

Another embodiment of the present invention will now be described.

In this embodiment, portable electronic equipment, which has both a recording function and a copying function and has a key input means, e.g., a typewriter, will be described.

When a recording operation is performed using a key input means, e.g., a keyboard, the recording operation corresponding to key inputs can be made on a recording medium. When an original read by an original read means is to be recorded, a recording medium and an original are synchronously fed to perform the recording operation. Therefore, data is first written by a key input operation and subsequently, data on an original, particularly, figure data, is recorded on a recording sheet, thus allowing edit recording. Since a copying function is added, data recorded by the key input operation can be copied a desired number of times.

A recording apparatus of this embodiment will be described in more detail with reference to the drawings.

The recording apparatus of this embodiment has a function for recording data on a recording medium, e.g., a recording sheet, in accordance with an input operation by an input means as will be described later (to be referred to as a typewriter function hereinafter), and a function for scanning an original to read data and recording the read original data on a recording sheet fed in synchronism with the original (to be referred to as a copying function). The typewriter function is a function for performing a recording operation in accordance with an input operation through an input means, such as a keyboard, e.g., an electronic typewriter, a word processor an electronic calculator, or the like. The copying function is a function for performing a recording operation in accordance with data obtained by scanning an original in the main scan and sub-scan directions by a facsimile system or a digital copying machine. The same reference numerals in this embodiment denote the same parts as in the above embodiment.

Figure 10:
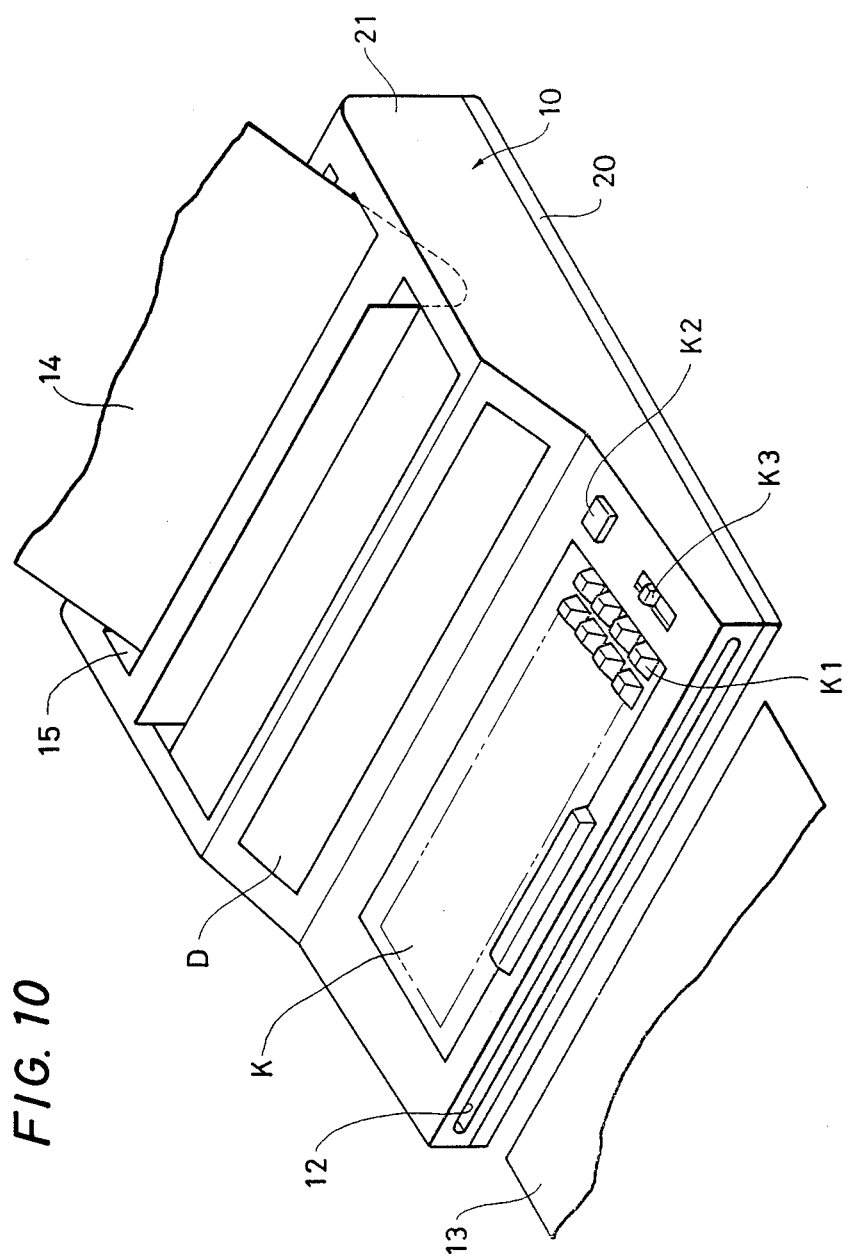

FIG. 10 shows an outer appearance of the recording apparatus according to this embodiment of the present invention, and FIGS. 11 and 12 show the internal arrangement thereof. A keyboard K including a function key group K1, a copying key K2, a power source switch K3, and the like is arranged on the front surface portion of a casing 10 of the recording apparatus. An original insertion port 12 for inserting an original 13 therethrough and a recording sheet insertion port 15 for inserting a recording sheet 14 therethrough are formed respectively in the front and rear end portions of the recording apparatus. A display unit D comprising a liquid-crystal panel, for displaying inputs from the keyboard, is arranged on the central portion of the recording apparatus.

Other arrangements are the same as those in the above embodiment. Therefore, the description for the original/recording sheet feeding system and the description for the read and record units in the above embodiment is omitted, and an electrical system different from the above embodiment will be described below with reference to FIG. 13.

Figure 13:
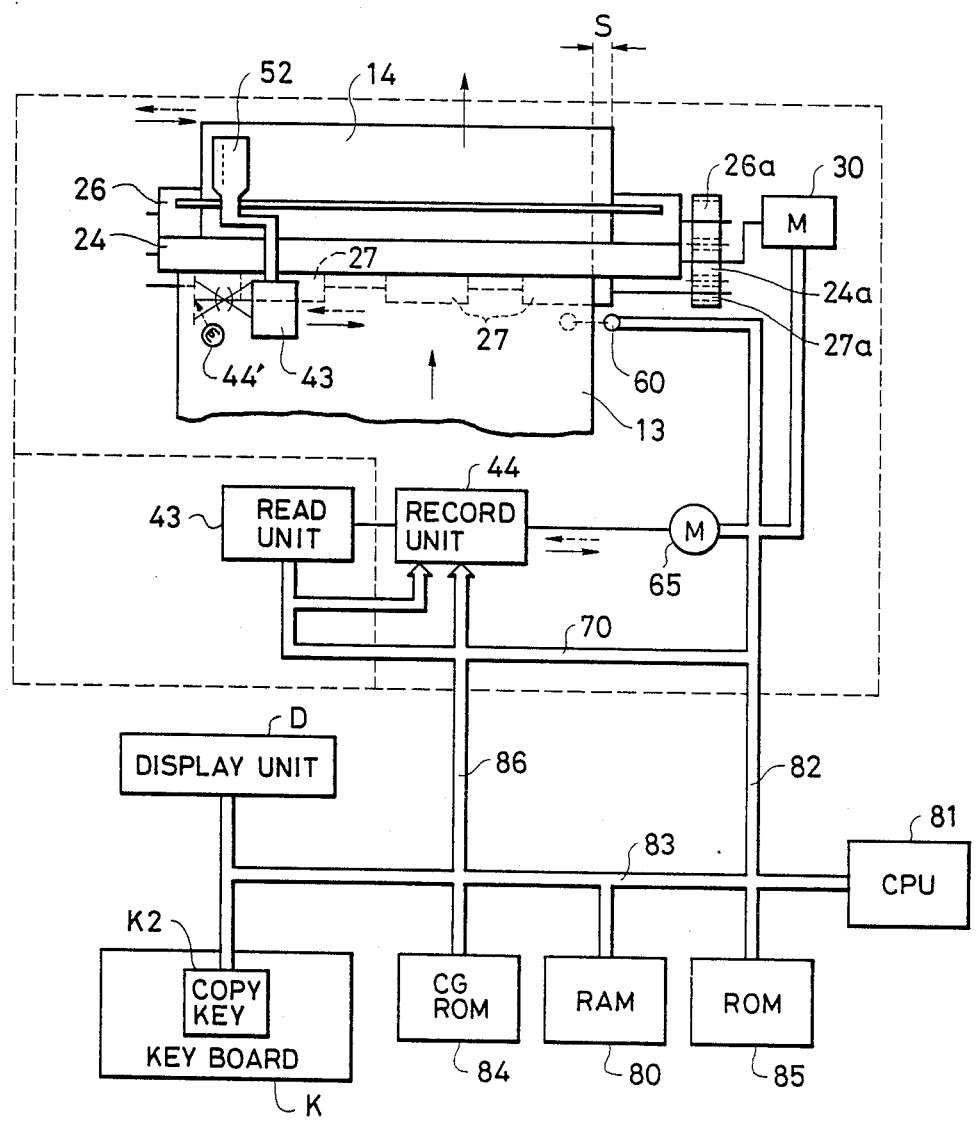

A signal read by a read unit 43 is input to a RAM (Random Access Memory) 80 through a signal cable 70, as shown in FIG. 13 and is processed under the control of a CPU (Central Processing Unit) 81. The CPU 81 receives a signal from a sensor 60 for detecting the presence/absence of the original through a signal cable 82, and controls main scan and sub-scan motors (step motors) 65 and 30 through the cable 82. Similarly, the CPU 81 is connected to the keyboard K, a character generator 84, a ROM (Read-Only Memory) 85, and the display unit D. A record unit 44 is connected to the character generator 84 and the CPU 81 through signal cables 83 and 86. The electronic circuit is arranged on a circuit board 90 provided in a lower portion of the apparatus.

The typewriter function of the recording apparatus of this invention with the above arrangement will now be described.

As shown in FIG. 12, the recording sheet 14 is inserted between a platen roller 26 and a main roller 25 serving as a first carrier from the recording sheet insertion port 15. When a rotary knob (not shown) is rotated in a direction indicated by arrow, the recording sheet 14 is fed through a path defined by the platen roller 26 and a notch portion 26a' in a U-turn manner. Then, the sheet 14 moves forward through the platen roller 26 and a main roller 24 to be guided along a guide member extending forward, and passes through a gap between a record head 52 and a flat platen 29 to be discharged outside the apparatus.

In order to facilitate setting of the distal end of the sheet at a position slightly above the record head 52, an index (not shown) is provided to an upper cover of the apparatus, thus positioning the sheet. If the sheet is excessively fed, the rotary knob can be rotated in the reverse direction to correct its position. This operation is the same as that normally performed by a user of an electronic typewriter. In this case, all the rollers 24 to 28 are in contact with each other, urged against each other, or coupled to each other, and are rotated synchronously without slipping.

Upon rotation of the knob, the distal end of the recording sheet 14 is moved in accordance with the rotating angle of the platen roller 26, and is stopped at a desired position. During this operation, since no original is inserted, rollers 27 and 28 for conveying and discharging the original are idled during normal or reverse rotation. A sensor 61, arranged below a guide member 35, for detecting the presence/absence of the recording sheet can prevent a recording operation while no sheet is inserted, and can also prevent an elastic member 29a from being contaminated with ink.

Figure 14:
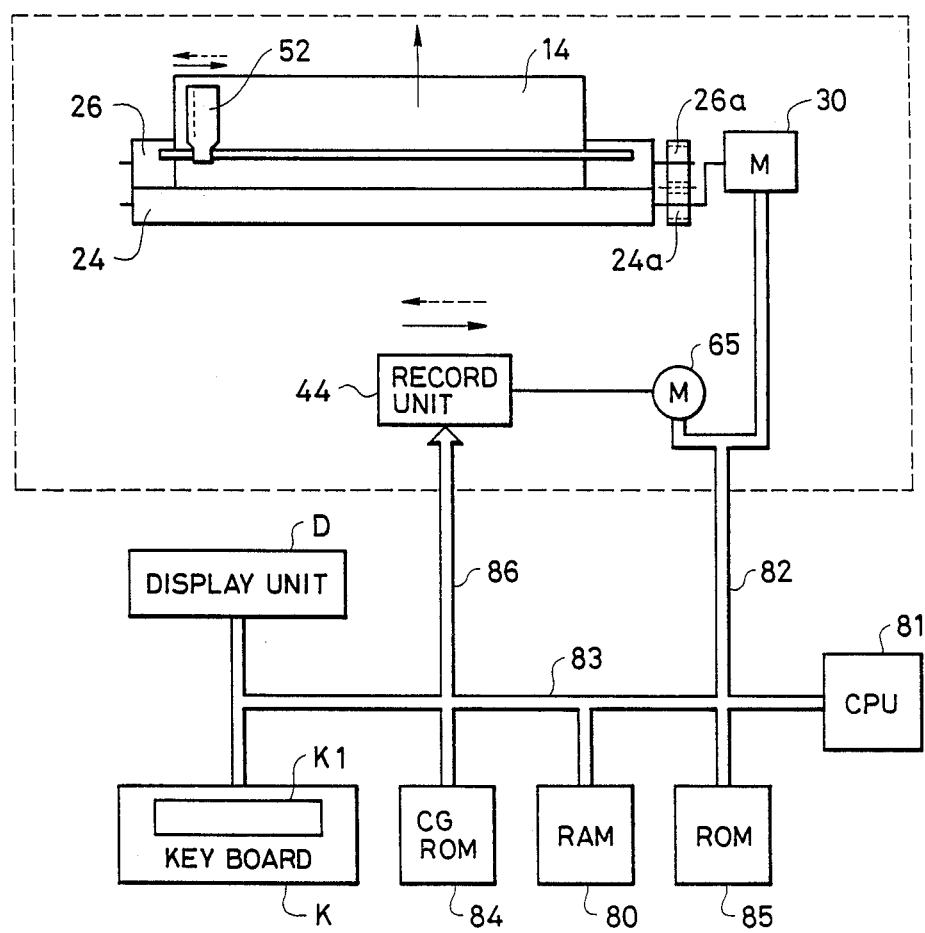

In the typewriter function, an operation mode shown in FIG. 14 is set, and character keys K1 on the keyboard K are selectively operated as required to perform an input operation in accordance with a document. In order to confirm the input document before recording, the input document can be displayed on the display unit D, so that operation errors during the input operation can be checked. Input characters are generated from the character generator 84, and are sent to the record unit 44 or the RAM 80.

The document arrangement corresponds to the recording density of the record head 52, and is determined by the specifications of the apparatus. Thus, the document arrangement depends on the recording character quality, e.g., $16 \times 16$ dots, $24 \times 24$ dots, $32 \times 32$ dots, etc. In the record head 52, a plurality of recording elements are aligned in line at a given pitch, so that data can be recorded at a predetermined resolution in the sub-scanning direction (i.e., the feed direction of the recording sheet) by the sub-scan motor 30. The number of elements of the record head 52 is more than that corresponding to the required recording character quality.

After checking the operation errors and correcting them, displayed characters are recorded on the recording sheet 14 by the record head 52 upon operation of a print input key. In this case, data can be directly recorded on the recording sheet 14 in accordance with the key inputs without performing the edit process.

During the recording operation, the record head 52 must scan parallel to the line direction with respect to the recording sheet. The record unit 44 mounting the record head 52 reciprocates along rails 40 and 41 parallel to the surface of the platen roller 26.

This scanning operation is performed by using the main scan motor (step motor) 65 driven by the CPU 81, which is operated in synchronism with a clock signal. A carriage 42 mounting the record unit 44 thereon is decelerated by gears in accordance with the rotating angle of the step motor as needed, and reciprocally scans through a timing belt 65a looped between pulleys.

The reciprocal scanning operation of the record unit 44 is performed at a speed suitable for a recording speed of the apparatus. When a thermal transfer recording operation is performed using $24 \times 24$ (dots) characters, 20 to 40 characters can be recorded, per second. The record head 52 is moved stepwise from the left (home position) to the right in a line. For example, when a $24 \times 24$ character is to be recorded, the record head 52 having 24 dots vertical elements or more repeats stepwise movement 24 times to record a character.

If another character is present in a line, the recording operation is performed on the right end. Thereafter, the record head 52 is returned to the home position upon reverse rotation of the main scan motor 65. Upon utilizing of this returning time, pulses are applied to the sub-scan motor 30 to prepare for the recording operation for the next line. The motor 30 is rotated by a specified number P1 of steps (FIG. 15A) in response to these pulses, so that the recording sheet 14 is moved forward and stopped by the rollers 24 to 26 driven thereby. A forward movement distance corresponds to a pitch between lines, and is defined by the size of a character.

A recording signal string corresponding to the above-mentioned serial recording is supplied from the character generator 84 to the record head 52, so that selected characters are recorded on the recording sheet 14 and the above operation is repeated. Upon completion of the typewriter function mode, the recording sheet is discharged outside the apparatus, and the series of operations are ended.

The above-mentioned typewriter function is not limited to an electronic typewriter but can be applied to a keyboard type wordprocessor. In this case, the same recording operation by the record head 52 as in the above embodiment can be performed, and character selection, edit, and drive control of the record head 52, signal supply to the record head 52, control of the main scan and sub-scan motors 30 and 65 are performed under the control of the CPU 81, thus allowing the similar recording operation to that of the electronic typewriter. This state is shown in power-on step S1' and operation step S2' of the electronic typewriter in FIG. 17.

A copying function, i.e., an original reading/recording operation will be described below.

The distal end of the recording sheet 14 is set at a specified position beyond the record head 52 upon rotation of the rotary knob, and the original 13 is set, as shown in step S4'. In this case, the original 13 is moved forward from the original insertion port 12 formed below the keyboard K by a manual operation to a read enable area of a read optical system with its character data surface facing upward. The original 13 is inserted until it is brought into contact with the main roller 24 and the driven roller 27. This position is detected by the sensor 60. It is preferable that a distance from one end a' (FIG. 12) of a prospective optical read length a—a' to the distal end of the inserted original 13 is substantially equal to a distance from the distal end of the recording sheet 14 to a dot start point of the record head 52.

Figure 16:
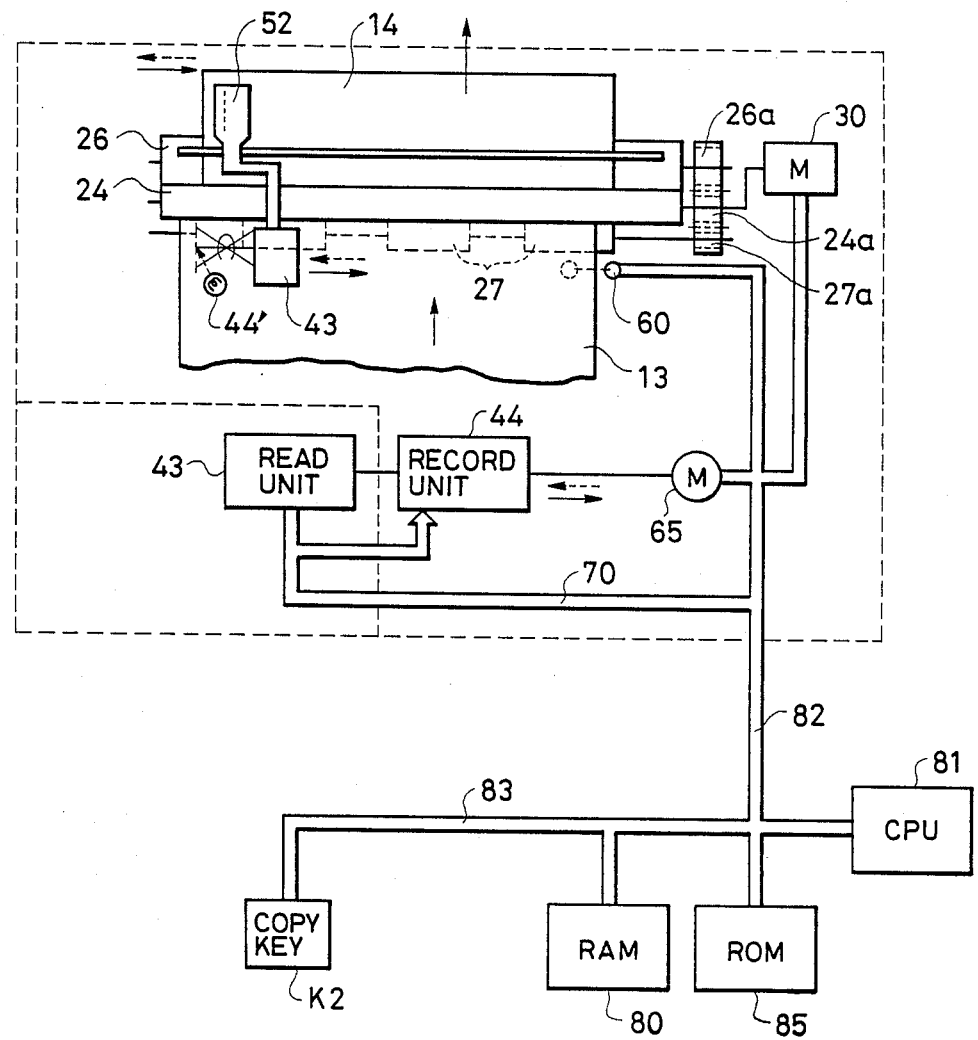

When insertion of the original 13 is detected by the sensor 60, a circuit operated when an original is present is selected, and the read scan is enabled. The record unit 44 is also automatically switched to a copying mode, and is in a state shown in FIG. 16.

Figure 17:
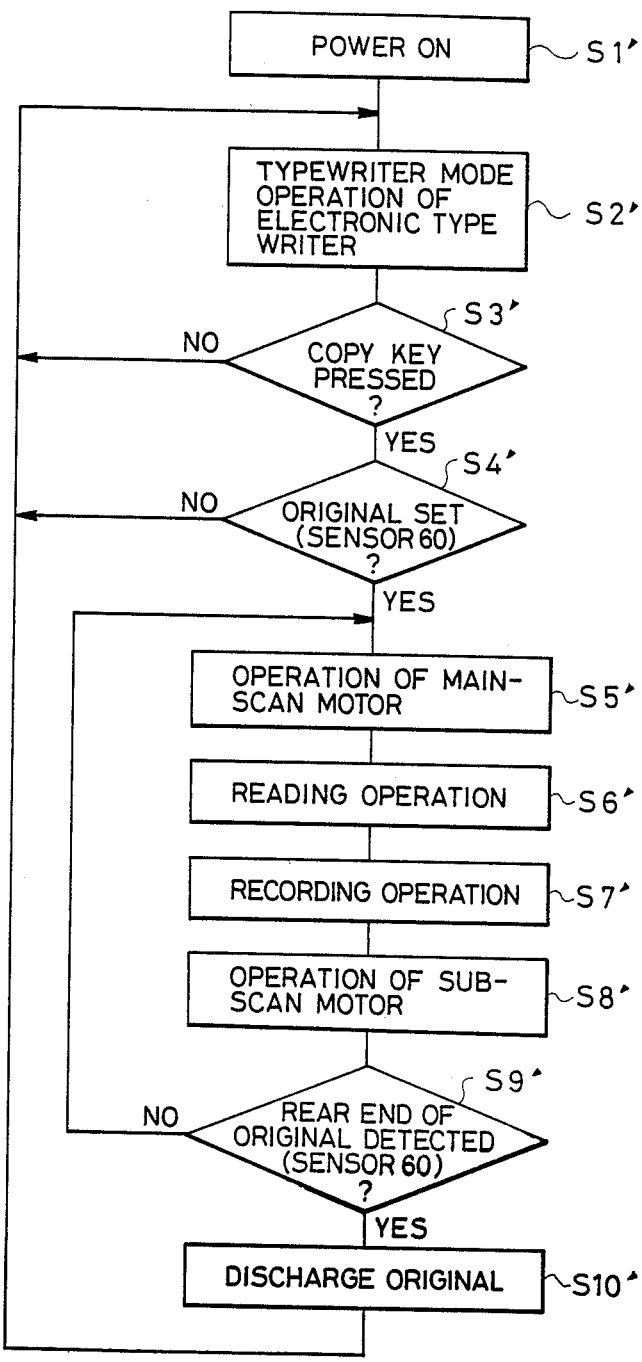

As shown in step S3' in FIG. 17, the copying key K2 (FIG. 16) of the keyboard K is operated to set the copying mode. Upon starting of the operation, an illumination light source 44' is turned on, and the reading operation is started under the control of the CPU 81. The read optical system of the read unit 43 is moved stepwise in the main scan direction by the main scan motor 65 (step S5'). The original 13 is illuminated with the light source 44', and light reflected thereby is focused on a line sensor 46 through a lens 45, thus starting the read operation (step S6'). Accumulated analog data from the line sensor 46 is read out for each pixel in synchronism with stepwise movement of the original. The read data is amplified by an amplifier 73 through an automatic sensitivity adjusting circuit 75, and is converted to a digital signal by an A/D converter 74, thus photo-electrically converting the image data of an object. At this time, if necessary, a memory, e.g., a line buffer, can be prepared to store data for image processing.

Operation control of the CPU 81 is performed by a program stored in a permanent memory (ROM) 85. The read signal is supplied to the record unit 44, so that the recording operation is performed at the same resolution as that in the typewriter function mode in synchronism with the stepwise feeding of the original (step S7'). In this case, if a plurality of high-luminance LEDs are linearly arranged on the illumination light source 44' adjacent to the two-dimensionally read original and the read unit comprises a wide angle, short focal length lens or a bright SELFOC multi-eye lens having an F number exceeding 2 and a small Tc value, the reading operation can be performed it a relatively high speed. In order to output data from the record head 52 at the same time when the data is read, since the reading and recording operations must be synchronously performed, the recording speed is preferably improved. The number of pixels of the read line sensor 46 is set to be at least equal to or more than the number of record dots of the record head 52. Image signals of an object read by a large number of sensor bits can improve a read resolution. When the signals are ANDed or ORed to correspond to the number of dots of the record head, a fine, high-quality copy with almost no image error, can be obtained.

Figure 15B:
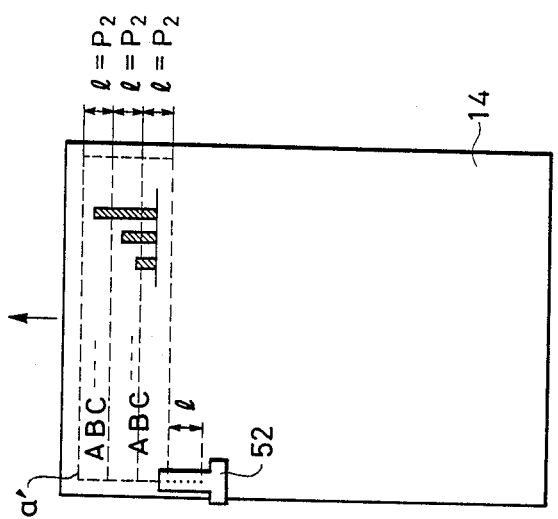
FIGS. 15A and 15B are representations for explaining the recording operation.
Figure 15A:
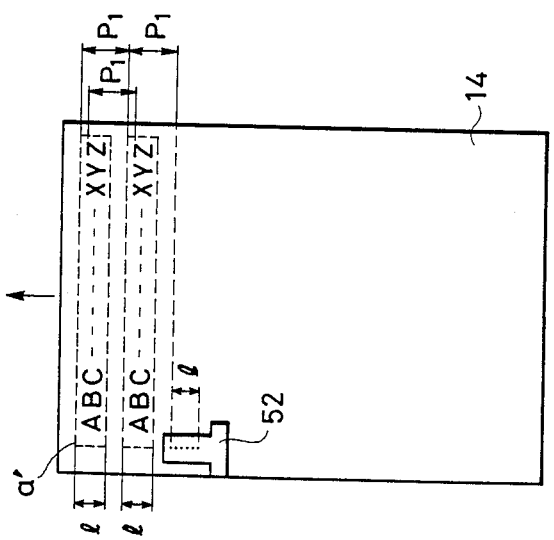

Note that a feed pitch P2 of the original 13 and the recording sheet 14 which are intermittently fed in the sub-scanning direction in the copying function mode is determined by the total length (l) of the elements of the record head 52, as shown in FIG. 15B, and cannot exceed this. This is because since image data on an object is not limited to characters in the column direction but can be a continuous image, e.g., a figure, read or record errors must be eliminated. Therefore, the feed pitch of the sheet in the sub-scanning direction is different from a line pitch P1 in the typewriter function mode, as shown in FIG. 15A. For this reason, when the copying key K2 is depressed to set the copying function mode, the pulse number for the sub-scan motor 30 is automatically switched from P1 to P2 by the CPU 81. In this manner, in the copying function mode, the signal read by the reciprocal scanning (main scanning) is immediately supplied to the record head 52 to perform the recording operation at substantially the same time, and the original 13 and the recording sheet 14 are intermittently fed at the pitch P2 by the above-mentioned main scan. When the above operation is repeated in the longitudinal, feed direction of the original 13, the recording operation can be performed (steps S7' and S8'). Note that the feed directions of the original and the recording sheet in the copying function mode are opposite to each other with respect to the sub-scanning direction in order to perform the reading and recording operation of the original at the same time.

When the rear end of the original is detected by the sensor 60 (step S9'), the main scan of the original is ended, and the optical system and the record head 52 are returned to their home positions. In addition, the sub-scan motor 30 is driven until the original 13 and the recording sheet 14 are free from the final roller, to discharge the original 13, thus ending the overall operation (step S10').

In this manner, the sensor 60 is used for obtaining a signal for starting and ending the copying operation.

After the original is discharged in step S10', the flow automatically returns to step S2', i.e., the control of the typewriter function. Thus, the operation mode is returned to the typewriter function which is frequently used.

In this embodiment as described above, a typewriter having both a recording means and a copying function has been described.

FIGS. 18 to 23 show another embodiment of the keyboard K and the original insertion arrangement. Typewriters having long histories have been designed in terms of the human technology, so that their upper surfaces are tilted toward the front side to make operation easier, and their front end portions are very thin for the purpose of an on-table use. In electronic typewriters and wordprocessors, the display unit D is arranged at a location behind the keyboard K easy to see for character confirmation, adjustment, edit and the like after the key operation.

In this embodiment as described above, the original insertion portion is constituted by an original guide path defined by the upper and lower guide plates 37 and 36 immediately below a base unit 92 of the keyboard K.

Figure 18:
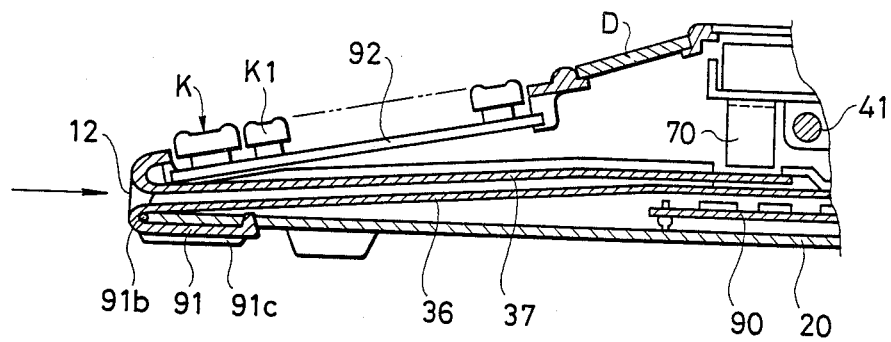
Figure 19:
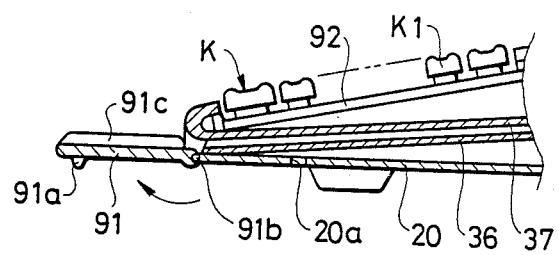

Upon insertion of the original, a guide table 91 folded and stored in the lower portion of the base can be withdrawn to the front side only in the original reading operation to serve as an auxiliary table, thus improving an operability. At this time, the guide table 91 is pivotal about a shaft 91b when it is spreaded to serve as an auxiliary table for inserting the original, as shown in FIG. 19. When the table 91 is unused, it is folded such that a projection 91a of the guide table 91 is engaged with a recess 20a of the base 20, as shown in FIG. 18.

Figure 20:
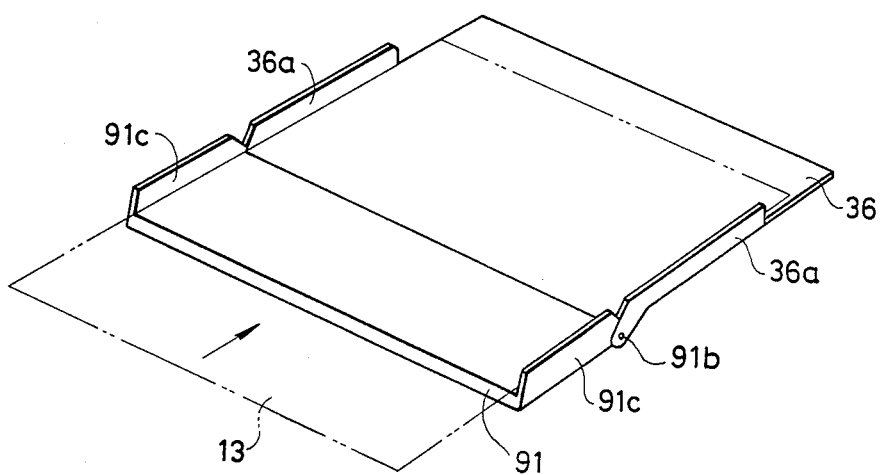

As shown in FIG. 20, guide walls 91c are integrally formed at the two sides of the guide table 91 to prevent the original 13 from being fed obliquely. If guide walls 36a are formed at the two sides of the lower guide plate 36 to be connected to the guide walls 91c, insertion precision of the original 13 in the sub-scanning direction can be further improved.

Figure 21:
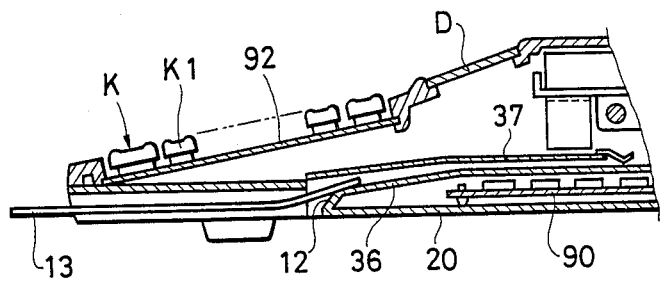

The original insertion port 12 need not be formed in the front end portion of the apparatus, but can be formed in the bottom portion, as illustrated in FIG. 21. In this case, the base of the apparatus terminates below substantially the central portion of the keyboard K to serve as an original insertion port 12'. In this case, the original is inserted so that its distal end is introduced from the front, side, or bottom portion of the keyboard K, and is inserted in the original insertion port 12'.

Figure 22:
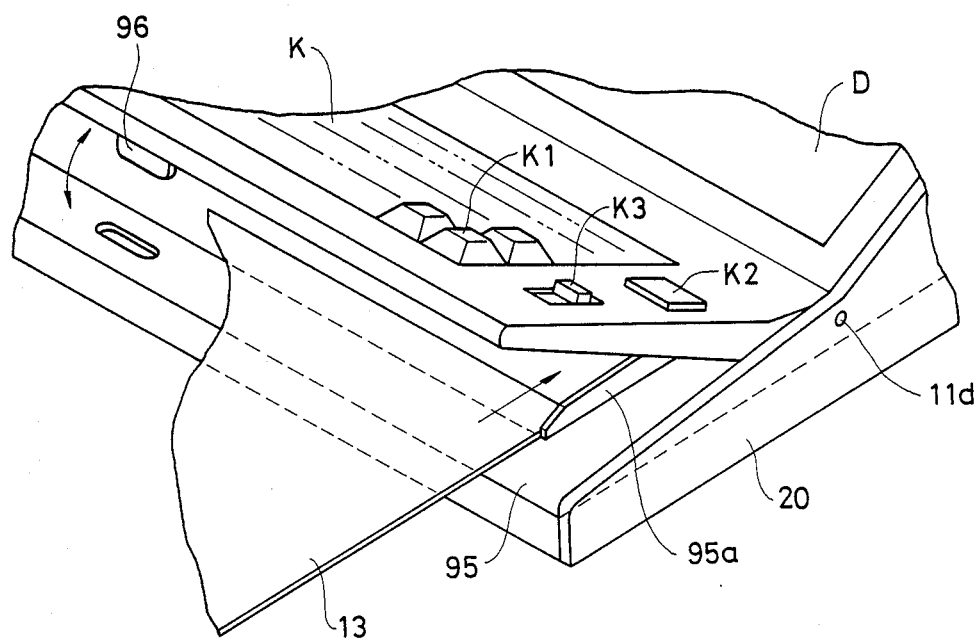
Figure 23:
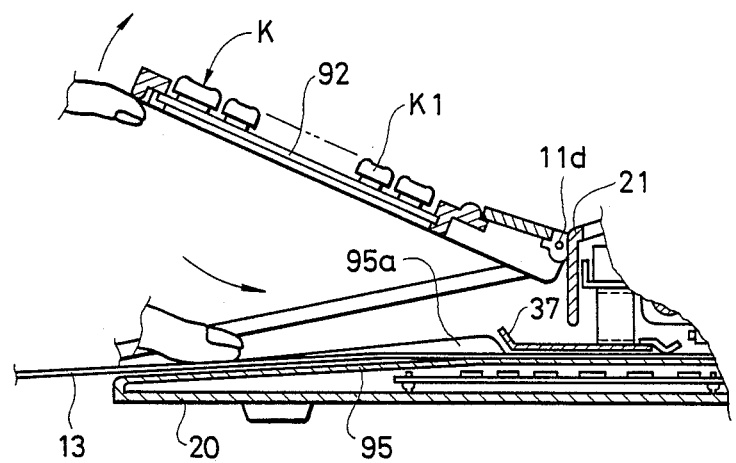

In order to further facilitate the insertion of the original 13, as shown in FIGS. 22 and 23, a hinge portion can be constituted by an outer casing 21 of the apparatus and the keyboard K to have a pivot 11d of the keyboard K as the center, so that the keyboard K can be opened upward by a manual operation. When an opening angle is arbitrarily set, an operator can observe a wide area below the keyboard. An original guide member 95 suitable for the size of the original to be read is arranged below the keyboard K, and guide walls 95a perpendicular to the moving direction, i.e., the main scan direction, of the read optical system, are formed to coincide with the two side edges of the original. In order to appropriately introduce the original to the read unit in the rear portion of the apparatus, the distal end portion of the upper guide plate 37 is bent upward. The original having a large length in its longitudinal direction can then be easily guided, can pass by the read area, and can be inserted from its distal end between the rollers. With this arrangement, in addition to easy insertion of the original, a small-sized original can be reliably fed and can be subjected to the reading operation. Note that after insertion of the original or when the keyboard is used, the keyboard K is closed and is locked by a lock means 96 realized by a closing magnet or hook.

As described above, in this embodiment, the recording operation in accordance with the input operation from the keyboard and the original reading/recording operation can be selected through a selection means using a single recording means to perform a copying operation. Data can be recorded by the key input operation, and data on an original, e.g., figure data, can then be recorded on a recording sheet, thus allowing edit recording. The drive system can be simplified, the reliability of the convey system can be improved, and the entire apparatus can be lightweight, thus realizing a thin, compact, low-cost apparatus. In addition, since the apparatus of this embodiment is portable, a multifunctional portable apparatus having satisfactorily functions can be provided.

Still another embodiment of the present invention will now be described with reference to FIGS. 24 to 27.

In this embodiment, a recording apparatus which can properly set an original at a predetermined position upon insertion of the original and in which an operator can easily and satisfactorily perform an original insertion operation for a reading operation, will be described. In this embodiment, during the reading operation of the original, a key input means is opened upward when an original is inserted. In synchronism with the open operation, a positioning means is moved within an original feed path, and the inserted original is regulated by the positioning means to be set at a proper position. In this manner, the operator can easily and reliably perform an original insertion operation for the reading operation.

This embodiment will be described in detail with reference to the drawings. In this embodiment, since the same control operation as in the previous embodiments is performed, a description thereof is omitted, and differences in mechanism will be described below.

Figure 24:
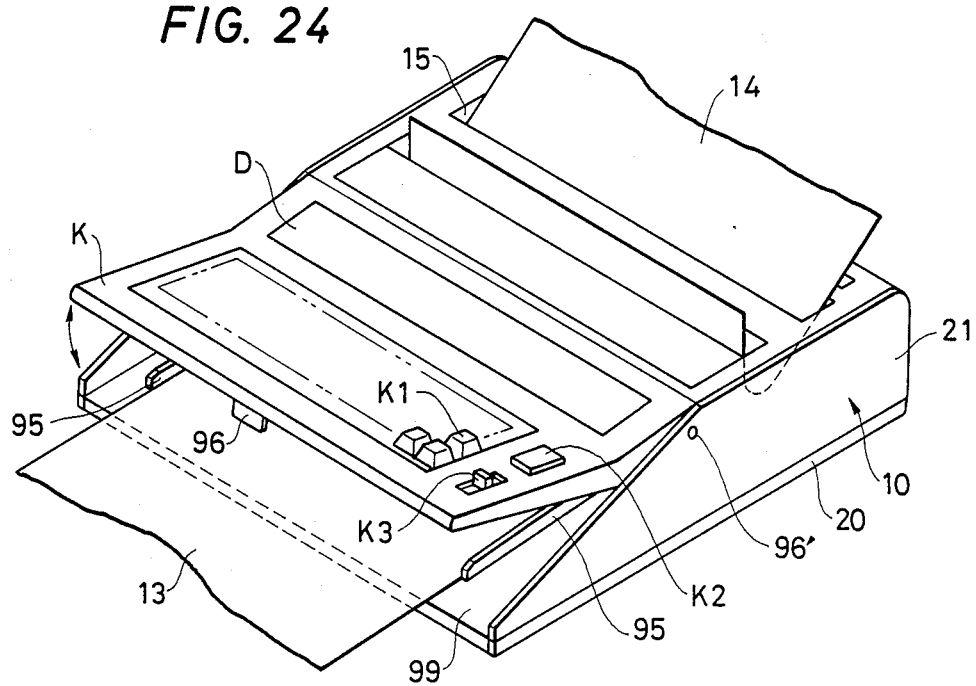

FIG. 24 shows the outer appearance of the recording apparatus according to the embodiment of the present invention. A keyboard K including character keys and function keys K1, a copying key K2, and a power source switch K3 is arranged on the front surface portion of a casing 10 of the recording apparatus. As will be described later, the keyboard K can be pivoted upward about a shaft 96' by releasing a lock means 96 comprising, e.g., a magnet. When an original 13 is inserted for a reading operation, the keyboard K is opened upward, and the original 13 is inserted along side plates 95. A recording sheet insertion port 15 for inserting a recording sheet 14 therethrough is formed on the rear end portion of the apparatus.

A driven roller 27 is arranged under a main roller 24 to be parallel to each other while maintaining an urging state necessary for feeding a sheet. An elastic spring 98 fixed to a guide plate 97 is in contact with a main roller 25 to keep a proper urging force thereagainst. The original 13 is clamped between the main roller 24 and the driven roller 27, and the main roller 25 and the elastic spring 98, and is fed almost horizontally.

Upper and lower original guide plates 37 and 36 are arranged in a substantially horizontal state along the contacting surface of the driven roller 27 contacting the main roller 24. The lower guide plate 36 extends forward, and serves as an original table 99 shown in FIG. 24.

As shown in FIGS. 25A, 25B, and 26, arms 100 each having an elongated groove 100a are fixed to the two sides of the frame of the keyboard K. The arms 100 are pivoted clockwise when the keyboard K is opened upward as shown in FIG. 25B.

The main roller 24 and the driven roller 27 are supported by side plates (not shown) of the casing having vertically elongated holes through bearing portions 24a and 27a, so that one or both of the rollers 24 and 27 are vertically movable. Grooved members 24b and 27b are inserted outside the bearing portions 24a and 27a, and horizontally movable arms 101 having a height l are fitted in the grooves near the side plates of the casing. Pins 101a engaged with elongated grooves 100a of the arms 100 are projected from one ends of the arms 101. Upon pivotal movement of the arms 100, the arms 101 are horizontally moved. When the rollers 24 and 27 are in contact with each other, the height of a space defined by the members 24b and 27b is larger than l, so that the arms 101 can be freely moved while the rollers are in contact with each other. Note that in order to keep the urging state of the rollers 24 and 27, tension springs 102 are arranged on small grooved portions 24c and 27c of the members 24b and 27b.

Cams 101b are formed on the horizontal moving arms 101. When the keyboard K is opened, the arms 101 are moved to the left, and the cams 101b open the members 24b and 27b vertically by 0.5 to 1 mm against the biasing force of the springs 102. Thus, the rollers 24 and 27 are moved vertically by a predetermined distance, as shown in FIG. 27B.

A finger member 104 having lower and upper bent portions 104a and 104b is arranged on a shaft 103 supported by the side plates of the casing to be swingable about the shaft 103. Coil springs 105, the other end of each of which is coupled to the casing, are coupled to the finger member 104. The finger member 104 abuts against the cams 101b at its planar portion to be held almost horizontally. At this time, the bent portions 104b are located below the tangents of the rollers 24 and 27, and do not prevent horizontal feed of the original 13.

Figure 27A:
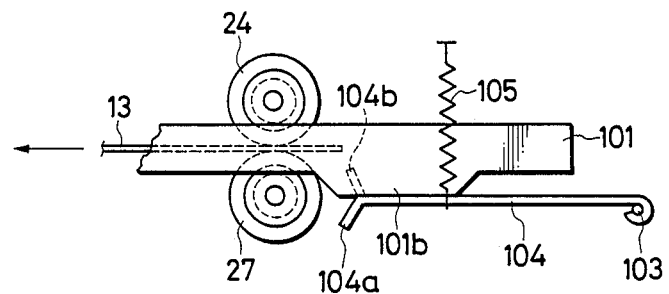
Figure 27B:
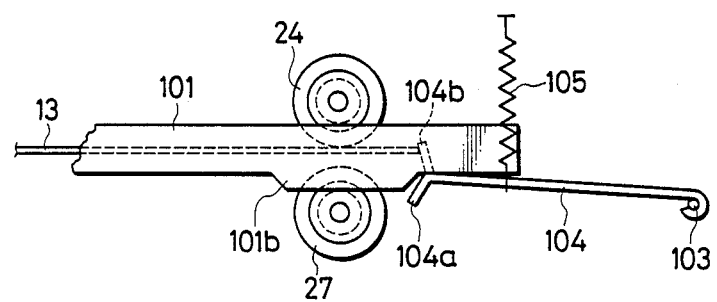

When the keyboard K is opened upward, the arms 101 are moved to the left, and the inclined surfaces of the cams 101b abut against the bent portions 104a of the finger member 104, as shown in FIG. 27B, and the rollers 24 and 27 are released, as described above. At this time, the finger member 104 is slightly pivoted upward by the springs 105, so that the bent portions 104b enter the feed path of the original 13 to position or regulate the distal end of the original 13, thus setting the original at a proper position.

When the keyboard K is closed after the original is set as described above, the arms 101 are moved to the right to a position shown in FIG. 27A, and the original 13 is clamped between the rollers 24 and 27, thus allowing the original feed and reading operations.

When the keyboard K is opened and the original 13 is inserted, the distal end of the original abuts against the bent portions 104b of the finger member 104, as shown in FIG. 27B. In this case, if the bent portions 104b are set at positions to be separated from a line connecting the centers of the rollers 24 and 27 by several millimeters, when the keyboard K is closed after the original has been inserted, the original 13 can be reliably clamped between the rollers 24 and 27 in a proper state without being bent, and the bent portions 104b of the finger member 104 are moved downward. Then, the next feeding and reading operations as the next operations can be performed smoothly.

According to this embodiment as described above, an original positioning means enters an original feed path to be interlocked with the upward opening operation of a key input means, and the urging state of feed rollers is canceled. Therefore, upon insertion of the original, the original can be set at a proper position, so that an operator can easily and reliably perform an original insertion operation for its reading operation.

An image reading apparatus which can be applied to the above-mentioned recording apparatus will be described.

An embodiment will be described in detail with reference to the accompanying drawings. In this embodiment, an image reading apparatus used in an original read unit of a reading/recording apparatus having a copying function will be described. However, this apparatus can be applied to an image reading apparatus having no recording apparatus.

Figure 28:
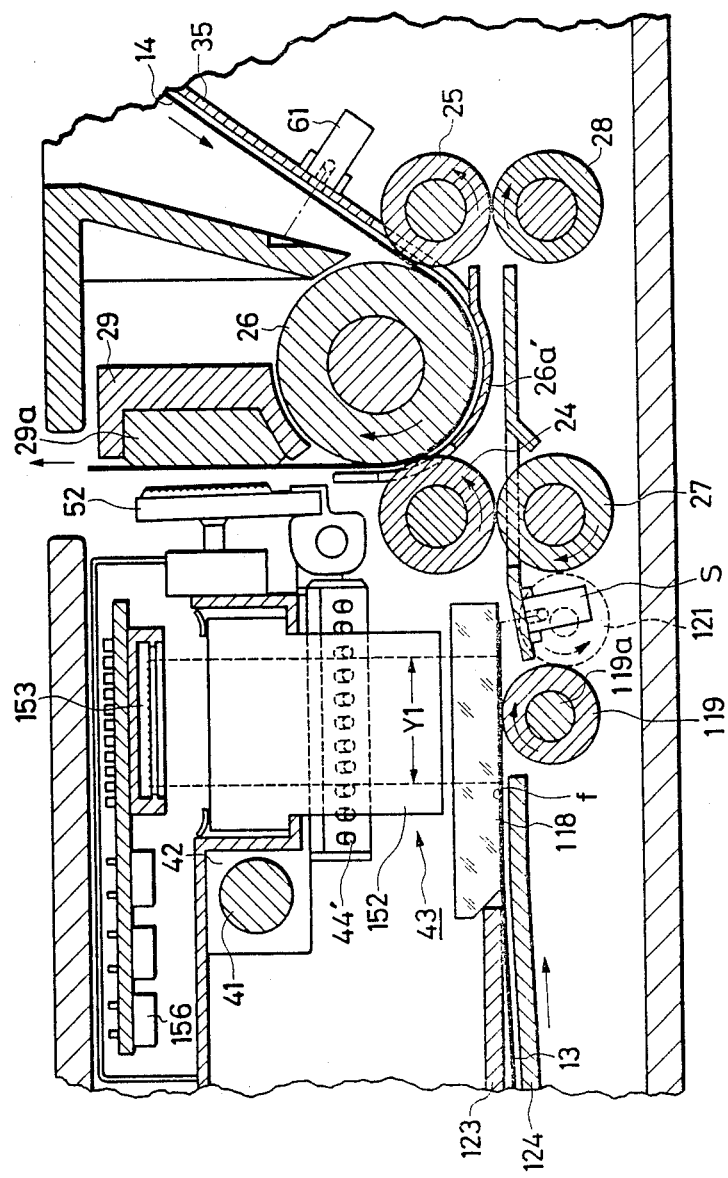
Figure 29:
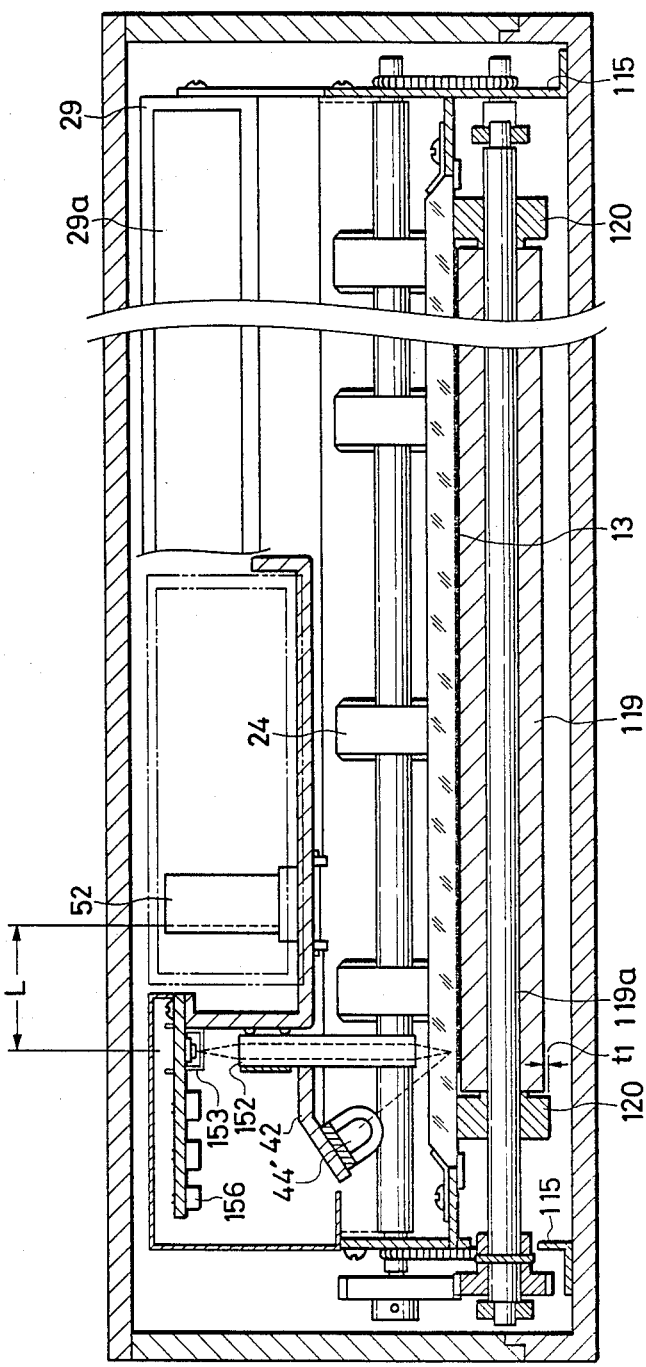

FIGS. 28 and 29 are for explaining the arrangement of this embodiment, and are respectively a sectional side view and a sectional front view showing the arrangement around an original read unit of the reading-/recording apparatus.

In FIGS. 28 and 29, upper and lower guide plates 123 and 124 constitute a feed path of an original 13 up to a read position indicated by two alternate long and short dashed lines in FIG. 28. A transparent glass plate 118 having a uniform thickness is horizontally arranged above the read position to have its lower surface as a read surface f of the original 13. The position of the read surface f is located at a best-focus plane determined by the positional relationship between itself and a read system (to be described later).

Figure 30:
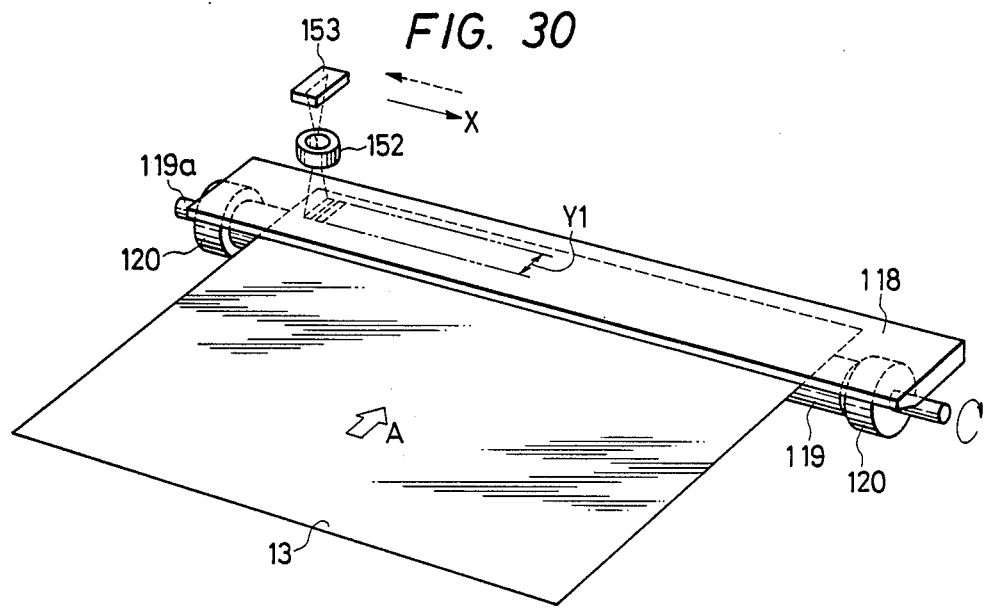
Figure 31:
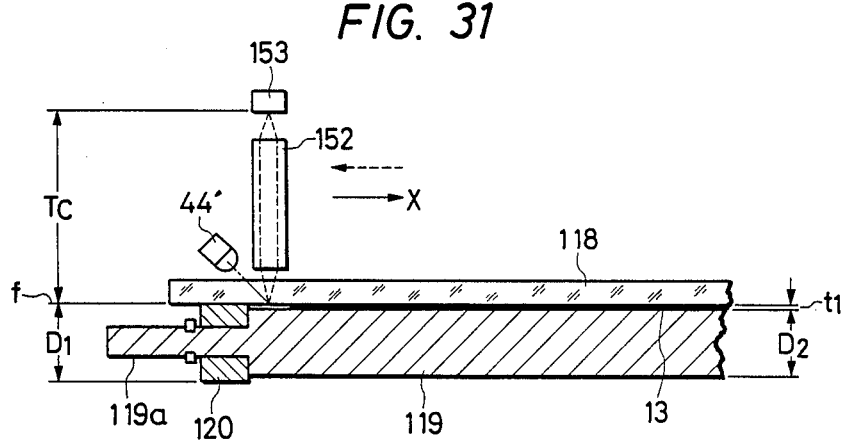

A roller 119 is arranged below the read position of the transparent glass plate 118, so that the original 13 is clamped between the roller 119 and the glass plate 118 to position the original surface at the read surface (best-focus plane) f. The roller 119 is formed of a resin or rubber material, and is preferably white in color. As shown in FIGS. 29 to 31, cylindrical, idler gap forming members (rollers) 120 are pivotally supported by the two end portions of a shaft 119a of the roller 119 axially supported by frames 115. As shown in FIG. 31, an outer diameter D1 of each gap forming member 120 is larger an outer diameter D2 of the roller 119. Since the gap forming members 120 are in contact with the lower surface of the transparent glass plate 118, a gap t1 is formed between the transparent glass plate 118 and the roller 119. The gap t1 is set to be substantially equal to the thickness of an original sheet (about 50 $\mu$m), so that the roller 119 can maintain the best-focus plane and can feed the original.

A sensor S for detecting the presence/absence of an original 13 is arranged below the transparent glass plate 118.

Two pairs of feed rollers 24 and 27, and 25 and 28 are arranged at a given interval at the downstream side (right side in FIG. 28) of the transparent glass plate 118 along the original feed path. The feed rollers 24, 25, 27 and 28, and the roller 119 are supported parallel to each other between the frames 115 of the casing and are interlocked through a gear mechanism, e.g., an idle gear 121 so as to have the same peripheral velocities. Upon driving of a sub-scan motor, these rollers are rotated to feed the original 13 to the right in FIG. 8. A tray (not shown) is arranged at the downstream side of the feed rollers 25 and 28, and the original 13 is discharged onto this tray.

A platen roller 26 is pivotally supported by the frames 115 slightly above and between the feed roller pairs 24 and 27, and 25 and 28 to be urged against the rollers 24 and 25. The recording sheet 14 inserted from the upper rear portion of the apparatus along a guide plate 35 is clamped between the rollers 25 and 26 and passes between a guide plate 26a and the platen roller 26. The sheet 14 is then clamped between the rollers 24 and 26 and is guided between a record head 52 and an elastic member 29a of a flat platen 29 to be bent in an U shape, thus being discharged upward.

The platen roller 26, the feed rollers 24, 25, 27, and 28, and the roller 119 are urged against each other or can be integrally rotated through gears by a single sub-scan pulse motor, so that the original 13 and the recording sheet 14 can be synchronously fed in the sub-scan direction.

As shown in FIGS. 28 and 29, a light source 44' illuminates the original surface at the read position. A lens 152 comprises a SELFOC lens (tradename of Nippon Sheet Glass Co., Ltd.) in this embodiment, and forms an image on the original surface at the read position onto a sensor surface of a read sensor 153.

The light source 44', the lens 152, and the read sensor 153 are integrated as a read unit 43, and the unit 43 is mounted on a carriage 42 together with the record head 52. The carriage 42 is slidably arranged on a rail 41 extending parallel to the transparent glass plate 118 and the roller 119, and is slid along the rail 41 by a pulse motor (not shown), thus moving the read unit 43 and the record head 52 in the main scan direction.

A photo-electric converter 156 converts data read by the read sensor 153 into an electrical signal.

The operation of the apparatus with the above arrangement will now be described. The recording sheet 14 is set by operating the platen roller 26, so that its distal end (predetermined position to be recorded) faces the record head 52.

Subsequently, the original 13 is manually inserted between the upper and lower guide plates 123 and 124 from the left side in FIG. 28 until its distal end abuts against between the transparent glass plate 118 and the roller 119.

Upon operation of an operation key (not shown), the operation of the apparatus is started, and the roller 119 is rotated in the direction indicated by an arrow in FIGS. 28 and 30 by the sub-scan motor, so that the original 13 is fed to the right in FIG. 28 (in the direction indicated by arrow A in FIG. 30) while being urged against the lower surface of the transparent glass plate 118. When the front edge of the original 13 is detected by the sensor S, a sheet feed motor is stopped, and the original 13 is stopped at a position shown in FIG. 28.

The light source 44' is then turned on, and the carriage 42 is moved in the main scan direction (to the right in FIG. 29 along the longitudinal direction of the transparent glass plate 118) by the pulse motor (not shown). As shown in FIGS. 30 and 31, the read unit 43 consisting of the light source 44', the lens 152, and the read sensor 153 is moved stepwise in the direction indicated by arrow X.

As shown in FIG. 30, the original 13 is scanned by a read width Y1 of the original surface contacting the lower surface of the transparent glass plate 118. The read width Y1 can be arbitrarily set in accordance with the number of bits of sensor elements of the read sensor aligned in the sub-scan direction. As shown in FIG. 30, the lens 152 can comprise a cylindrical lens.

Light emitted by the light source 44' and reflected by the image of the original 13 forms an image on the sensor surface of the read sensor 153 through the lens 152. A bit signal accumulated for a predetermined time period is photo-electric converted into a digital image signal by the photo-electric converter 156. Subsequently, the image signal is input to the record head 52, and a synchronous recording operation is performed on the recording sheet 14. In order to perform the synchronous recording operation, the original 13 and the recording sheet 14 are shifted by a distance L in the sub-scan direction, as shown in FIG. 29.

In the reading operation, an area of the read width Y1 of the original surface shown in FIGS. 30 and 31 is urged against or in contact with the read surface f, i.e., the best-focus plane, of the lower surface of the transparent glass plate 118 to be located thereat. Therefore, a sharp image of the original 13 can always be obtained in a best-focus state.

After a single main scan operation is completed, the original 13 is fed by the read width Y1 in the direction indicated by arrow A in FIG. 30 (in the sub-scan direction), and the read unit 43 is moved in the direction indicated by arrow Z opposite to that of the carriage 42 and returns to the home position.

When the above operation is repeated, the reading operation of the entire surface of the original 13 is completed. After the rear end of the original 13 has passed between the transparent glass plate 118 and the roller 119, the roller 119 is not in contact with the transparent glass plate 118 by the gap t1 and is idled. Therefore, the load of the sheet feed motor will not be increased unlike the conventional apparatus, and the original feed operation can be sufficiently performed by a sheet feed motor having a small torque. According to this embodiment as described above, the reading operation can always be performed in the best-focus state to obtain a sharp image, and the lens 152 having a small depth of field and focal depth can be used. In addition, a sheet feed motor having a small torque can be used.

The above arrangement associated with a gap between a roller and a read surface can be applied to various other image reading apparatuses in addition to a facsimile system.

As can be seen from the above description, according to this embodiment, since a gap substantially equal to the thickness of an original is formed between a roller for feeding an original and a read surface, the original can be supported to be in contact with the read surface, i.e., a best-focus plane. Therefore, an image on the original can be clearly read even by using a lens system having a small depth of field, and an original feed motor having a small torque can be used, resulting in compact, thin apparatus.

Still another embodiment of the present invention will be described with reference to FIGS. 32 to 36.

In this embodiment, a light source 44', a lens 152, and a read sensor 153 are integrated as a read unit 43, and the unit 43 is mounted on a carriage 42 together with a record head 52. The carriage 42 is slidably arranged on a rail 41 extending parallel to a transparent glass plate 118 and a roller 119 and feed rollers 24 and 27. Although not shown, the two end portions of the rail 41 are axially supported by frames 115 in the recording apparatus through elongated holes in the frames 115 to be vertically movable within a given range.

Rollers 126 are pivotally supported by supporting shafts 125a of frames 125 inside the lower end portions of the frames 125 extending outwardly toward two sides of the lower end portion of the lens 152, so that their lower ends are below the lower end of the lens 152. Since the rail 41 is vertically movable and the carriage 42 is pivotal clockwise in FIG. 32 about the rail 41, the rollers 126 are always in contact with the upper surface of the transparent glass plate 118. As will be described later, when the read unit 43 is moved along the main scan direction (the longitudinal direction of the transparent glass plate) on the transparent glass plate 118, the rollers 126 roll on the plate 118. More specifically, the carriage 42 and the read unit 43 are supported on the transparent glass plate 118 through the rollers 126.

With the above arrangement, since the distance between the lens 152 and the lower surface of the transparent glass plate 118 is equal to a sum of the distance between the lower ends of the lens 152 and the rollers 126 and the thickness of the transparent glass plate 118, it can be uniquely determined in accordance with the distance between the lower ends of the lens 152 and the rollers 126.

In order to appropriately set the distance between the lower ends of the lens 152 and the transparent glass plate 118 to use the lower surface of the transparent glass plate 118 as a best-focus plane, the positional relationship between the lens 152 and the rollers 126 is vertically adjusted before the read unit 43 is installed in the apparatus. In order to use the sensor surface of the read sensor 153 as a best-focus plane, the positional relationship between the lens 152 and the sensor 153 is also adjusted.

Figure 36:
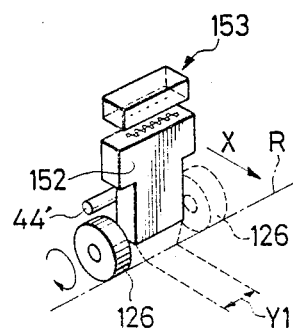

As shown in FIG. 36, the optical axis of the lens 152 is set to be perpendicular to a line R connecting the lower ends of the rollers 126, and the sensor surface of the read sensor 153 is set to be parallel to the line R.

When the adjusted optical system and the read unit 43 are mounted on the carriage 42 and are installed in the apparatus, the two rollers 126 are arranged to be in contact with the upper surface of the transparent glass plate 118 and the guide rail 41 is fixed to the frames 115. Although not shown, elongated holes allowing vertical movement of the rail 41 are formed in the frames of the casing at the rail coupling portions, so that the rollers 126 are first brought into contact with the plate 118, and then the rail 41 is fixed to the frames 115.

Figure 32:
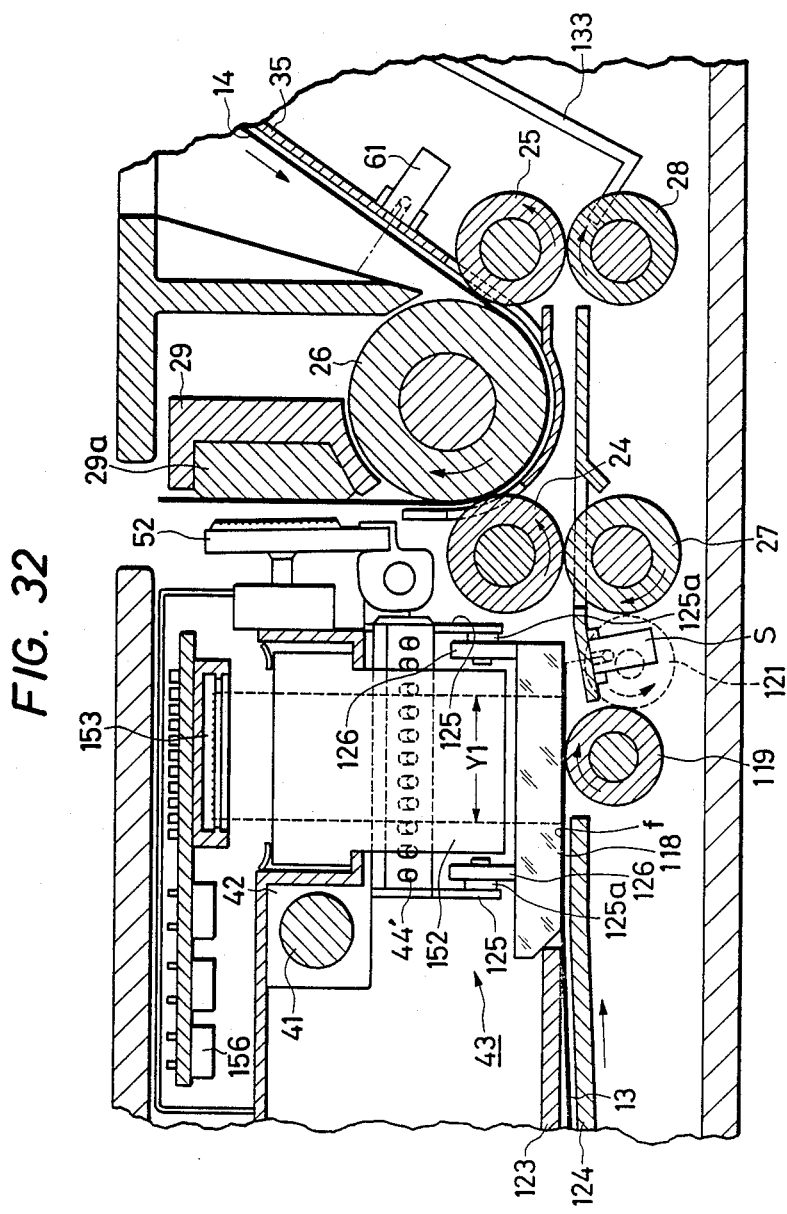
Figure 33:
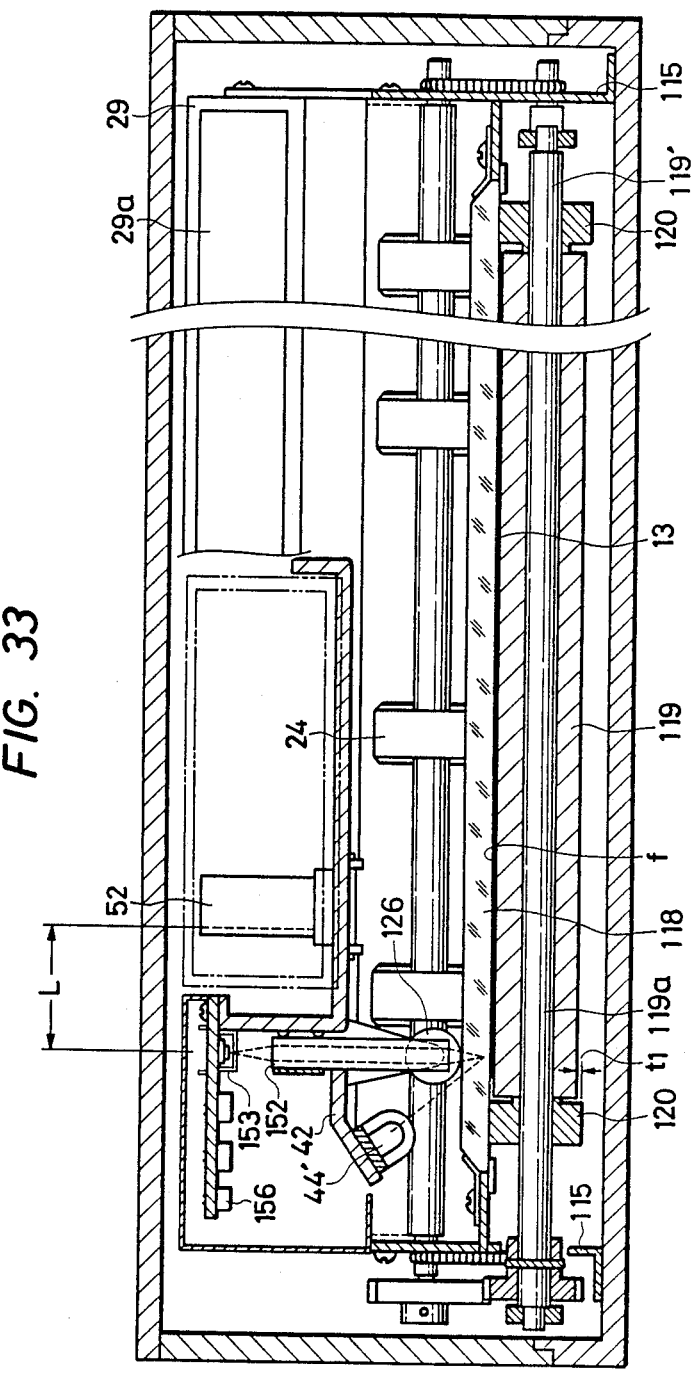

Since the carriage 42 applies a small clockwise moment to have the guide rail 41 as its rotating center, the lower surface of the right roller 126 in FIG. 32 is rotated and rolls over a moving area in the main scan direction. Note that a discharge tray 133 receives a discharged original.

Under these conditions, the upper surface of the original contacting the lower surface of the transparent glass plate 118 and the best-focus plane of the optical system completely coincide with each other, and a read condition with high reliability can be maintained over a long period of use, thus allowing high-quality image reading.

Figure 34:
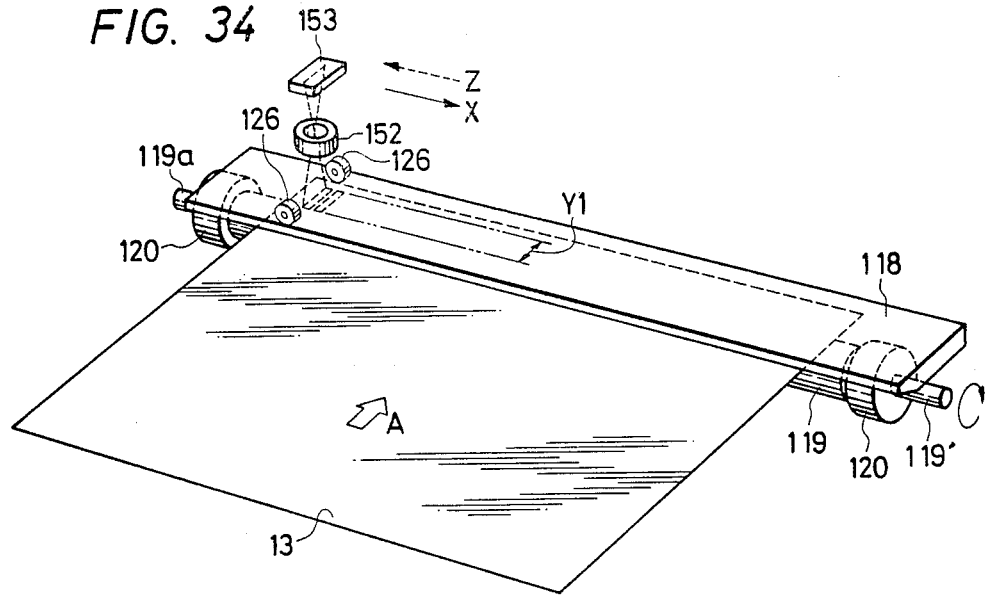
Figure 35:
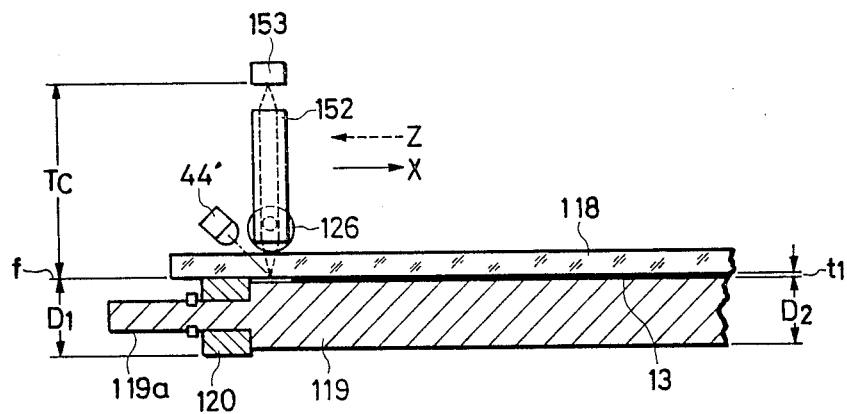

During the reading operation, as shown in FIGS. 34 and 35, the area of the read width Y1 of the original surface is urged against the lower surface of the transparent glass plate 118 by the roller 119. The read unit 43 in the main scan direction is moved to follow the upper surface of the transparent glass plate 118 through the rollers 126. In other words, the read unit 43 is moved to follow the lower surface of the transparent glass plate 118, i.e., the original surface, within the precision of the uniformity of the thickness of the transparent glass plate 118. Therefore, the distance between the lens 152 and the lower surface of the transparent glass plate 118 set in correspondence with the best-focus state can be kept unchanged regardless of variations in position of the transparent glass plate 118 or the precision of its parallel position. Therefore, the image on the original 13 can be clearly read in the best-focus state.

After a single scan operation, the original 13 is fed by the read with Y1 in the direction indicated by arrow A in FIG. 34 (sub-scan direction), and the carriage 42 is moved in an opposite direction, thus returning the read unit 43 in the direction indicated by arrow Z to its home position.

When the above operation is repeated, the reading operation of the entire surface of the original 13 is completed. After the rear end of the original 13 has passed between the transparent glass plate 118 and the roller 119, the roller 119 is not in contact with the transparent glass 118 to have the gap t1 therebetween and is idled. Thus, the load of the sheet feed motor will not be increased unlike the conventional apparatus. Therefore, a sheet feed motor having a small torque can sufficiently perform an original feed operation.

According to this embodiment as described above, the reading operation can always be performed in the best-focus state to obtain a sharp image, and the lens 152 can comprises a lens having small depth of field or focal depth. In addition, a sheet feed motor having a small torque can be used, resulting in a compact, thin apparatus.

Figure 37:
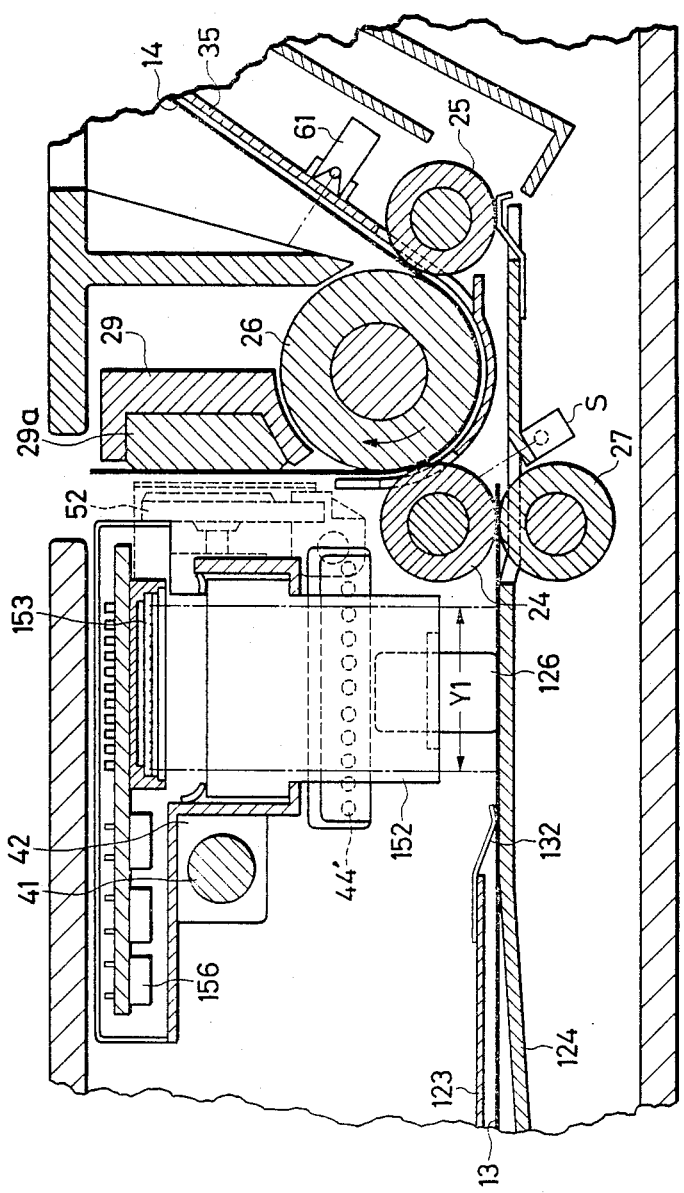
Figure 38:
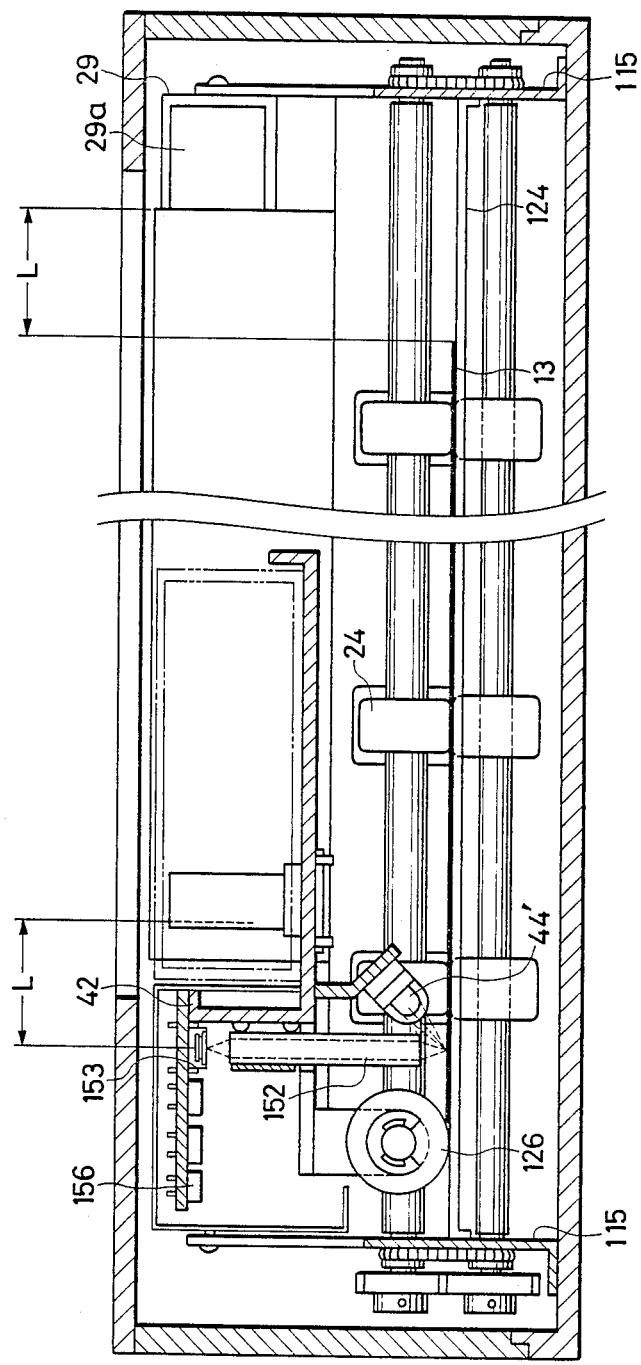

FIGS. 37 and 38 show still another embodiment of the present invention. The same reference numerals in FIGS. 37 and 38 denote the same parts as in FIGS. 32 to 36, and a detailed description thereof will be omitted.

In this embodiment, during a reading operation, a read unit is moved to directly follow an original surface. The arrangement of this embodiment shown in FIGS. 37 and 38 is different from that in the previous embodiments as follows.

Referring to FIG. 37, a lower guide plate 124 extends to its downstream side to be used as an original table in place of the above-mentioned transparent glass plate 118 and the roller 119, so that an original 13 is positioned at a read position below a lens 152. A guide member 132 is arranged at an end portion of an upper guide plate 123 near the read position at the upstream side so as to guide the original 13 to be in contact with the lower guide plate 124.

Figure 40:
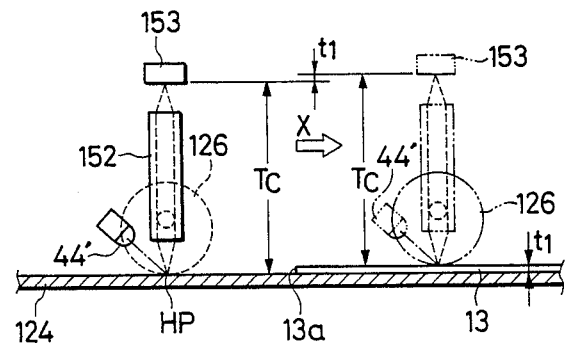

In this embodiment, a single roller 126 having a larger diameter than that in the previous embodiment is arranged adjacent to the lens 152 in the direction of its thickness (the main scan direction) at the central portion of the lens 152 in its widthwise direction (the sub-scan direction), so that the lower end of the roller 126 is below the lower end of the lens 152. A rail 41 is arranged to be vertically movable as in the previous embodiment, and a carriage 42 is pivotal clockwise in FIG. 37 about the rail 41 as a fulcrum as in the previous embodiment. Therefore, the roller 126 is in rotary contact with the original 13 or the lower guide plate 124, as shown in FIG. 40. The position of the roller 126 indicated by the dotted lines in FIG. 40 in the main scan direction coincides with the center of the lens 152 for the sake of simplicity in the following description. The distance between a sensor surface Tc in FIG. 40 and the lower end of the roller 126, the distance between the lower end of the roller 126 and the lens 152, and the distance between the lens 152 and the sensor surface Tc are set so that a best-focus state is obtained using the lower end of the roller 126 as a read surface.

The operation of this embodiment with the above arrangement will be described hereinafter.

As described above, a recording sheet 14 is set, and the original 13 is then inserted between the upper and lower guide plates 123 and 124 from the left side in FIG. 37 until it abuts against between feed rollers 24 and 27. In this case, the original 13 is guided on a read area to be in contact with the guide plate 124 through the guide member 132.

Figure 39:
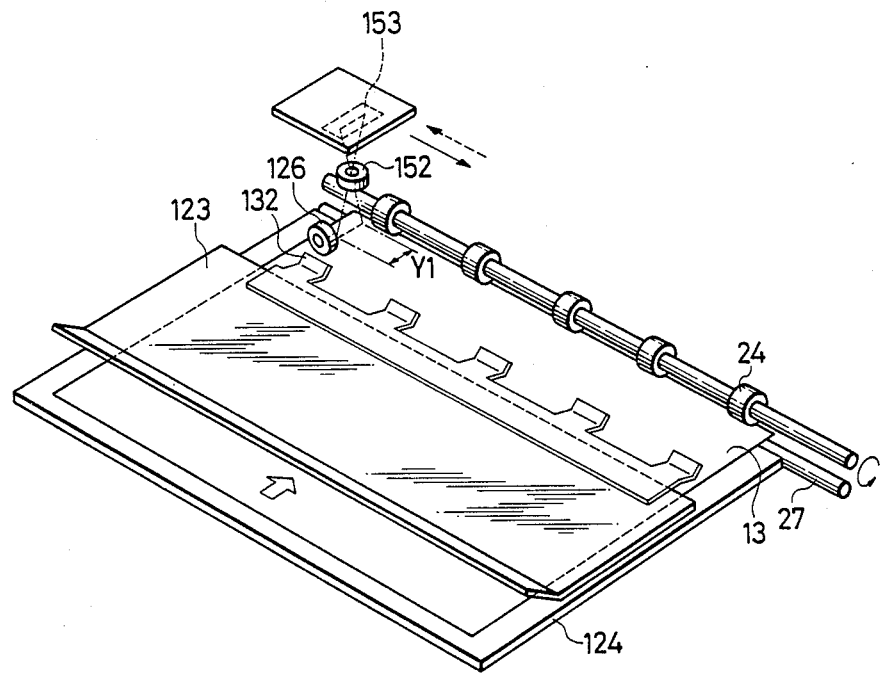

A sheet feed motor is then driven upon operation of an operation key (not shown), and the feed rollers 24 and 27 are rotated to feed the original 13 to the right in FIG. 37 (in the sub-scan direction indicated by arrow A in FIG. 39). When the front edge of the original 13 is detected by a sensor S, the sheet feed motor is stopped, so that the original 13 is stopped at a position shown in FIG. 37. In this state, since the original 13 is urged against between the feed rollers 24 and 27, it can be properly held on the read area.

A light source 44' is then turned on, and the carriage 42 is moved to the right in FIG. 38. Then, a read unit having its home position HP separated from an edge 13a of the original 13 by a predetermined distance is moved in the direction indicated by arrow X (the main scan direction), as shown in FIG. 40. A reading operation is performed by a read width Y1 as in the previous embodiment, as shown in FIG. 39 (in FIG. 39, the lens 152 comprises a cylindrical lens).

As shown in FIG. 39, the roller 126 is in contact with a portion adjacent to the read area of the original 13 and rolls thereover under pressure. Therefore, the read unit is moved in the main scan direction to follow the original surface.

When the roller 126 has reached the edge of the original 13 during movement in the main scan direction (indicated by arrow X), it is rotated while urging the original against the original table even if the original is slightly swelled, and the lower surface of the outer periphery of the roller 126 moves while satisfactorily reading the upper surface of the original 13 (read surface of an object).

During the reading operation in the main scan direction, since the lower end face of the roller 126 always coincides with the original surface, the distance between the original surface and the lens 152 can be kept to coincide with a distance between the lower end face of the roller 126 and the lens 152, which is set in correspondence with the best focus state, regardless of the difference in thickness of the original 13, bending of the lower guide plate 124, and the parallel relationship between the lower guide plate 124 and the rail 41, as shown in FIG. 40.

Therefore, the reading operation can be performed in the best-focus state to obtain a sharp image in the same manner as in the previous embodiment. The following operation is the same as that in the previous embodiment.

As described above, when the read unit is moved to directly follow the original surface or being through the transparent glass plate, the clear reading operation can be performed.

The arrangement associated with the distance between the roller and the read surface can be applied to various other image reading apparatuses in addition to a facsimile system.

Still another embodiment of the present invention will now be described. The following embodiment can be applied to the previous embodiments, and only a difference therebetween will be described.

In this embodiment, in an image reading/recording apparatus which records an original image read by an image reading means on a recording medium by a recording means, (a) the reading and recording means are arranged to be shifted in the main scan direction in order to satisfy a function of a read optical system and a record head and to realize a compact apparatus, and an original and a recording medium are shifted in the main scan direction in correspondence with the shift amount to perform the reading/recording operation, and (b) the image reading and recording means are arranged to be shifted in the main scan direction, and a recording operation timing is shifted by a scanning time corresponding to the shift amount.

With the arrangement (a), since a reading position of the image reading means with respect to the original and a recording position of the recording means with respect to the recording medium correspond to each other, the output of the reading means is directly supplied to the recording means, so that the reading and recording operations can be performed parallel to each other, i.e., at the same time. Therefore, an image memory can be omitted.

With the arrangement (b), an image memory having a small capacity need only be provided to store image data in a scanning area corresponding to the shift amount between the reading and recording positions. The shift amount can be set to be a very small value. Therefore, an image memory having a very small capacity can be used.

Figure 41:
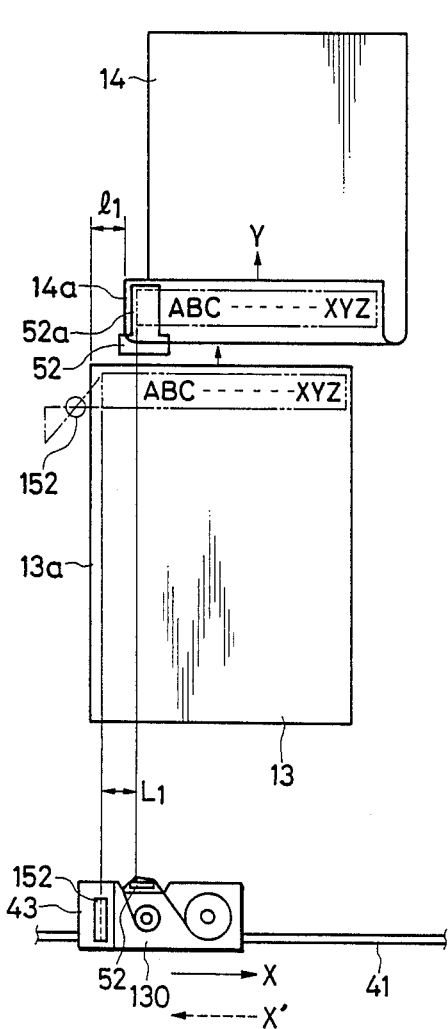
FIGS. 41 and 42 are views for explaining drifting of convey positions of an original and a recording sheet with respect to reading and recording positions.

In this embodiment, in order to simultaneously perform the reading and recording operations without using an image memory, guide members for the right and left side edges of an original 13 and a recording sheet 14 are arranged, such that the position of an edge 14a of the recording sheet 14 is shifted to the upstream side by a distance l1 equal to a shift amount L1 in the main scan direction, as shown in FIG. 41. With this arrangement, since the reading position with respect to the original 13 and the recording position with respect to the recording sheet 14 correspond to each other, if the reading and the recording operations are performed at the same time, an insufficient recording space will not be formed at an edge of the recording sheet 14, thus realizing simultaneous recording with reading without an image memory.

The arrangement of a record head 52 and a read unit 43 is reversed to the above arrangement, so that the read unit 43 is arranged at the upstream side of the record head 52 in the main scan direction. In this case, if the feed positions of the original 13 and the recording sheet 14 (the positions of the edges thereof) are aligned in the main scan direction to perform the reading and recording operations at the same time, an insufficient recording space will not form at the beginning of scanning.

Figure 42:
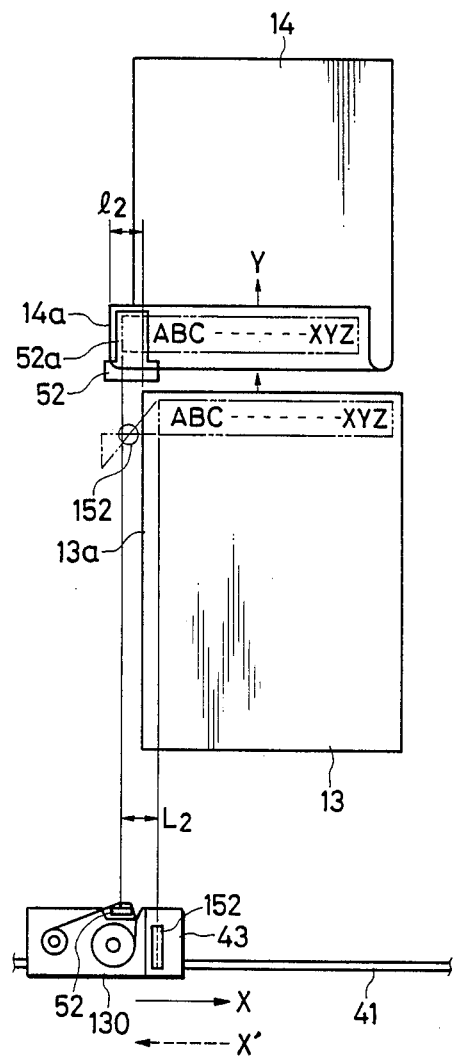

In this embodiment, as shown in FIG. 42, the position of the edge 13a of the original 13 is shifted from the edge 14a of the recording sheet 14 to the upstream side in the main scan direction by a distance l2 equal to a shift amount L2 between the reading and recording positions. With this arrangement, the reading and recording operations can be performed at the same time without an image memory as in the above case.

Alternatively, the feed positions of the original 13 and the recording sheet 14 (the positions of the edges 13a and 14a) are aligned in line, and the recording operation read by self scanning of the line sensor at a given density in accordance with pulse movement of the carriage 42 in the main scan direction, and is photo-electrically converted through the read sensor 46. Thus, the image data of the original 13 can be sent to the record head of the record unit 44 as a repetitive signal obtained by the read scanning operation in the sub-scan direction. In response to this signal, the optical system of the read unit 43, i.e., the mirror 131, the lens 45, and the line sensor 46 are arranged to at least cover the area a—a' in the sub-scan direction. Note that the lens 45 normally comprises a focusing lens, e.g., a so-called SELFOC lens (tradename of Nippon Sheet Glass, Co., Ltd.), and the line sensor comprises an equal magnification contact sensor. However, as shown in FIG. 6, the lens 45 can comprise a cylindrical lens, so that a reduced image can be detected by a CCD 71.

In FIG. 6, a signal read by the CCD 71 is driven by the driver 72 and is sequentially read. The read signal is amplified by the amplifier 73 and is output as a digital signal through the A/D converter 74. Note that the amplifier 73 is connected to the automatic sensitivity adjusting circuit 75 to automatically control gain. This circuit can be mounted on a circuit board 133 for mounting the CCD.

The record unit 44 has a record head 52 mounted on a holding member 51, which is arranged on the carriage 42 to be swingable about a fulcrum 50. On the record head 52, a plurality of heating elements are linearly aligned in the sub-scan direction. In this embodiment, a cassette 53 incorporates a thermal transfer ribbon 54, and an end portion of the ribbon 54 is wound around a takeup bobbin in the cassette through the element surfaces of the record head 52.

Figure 45:
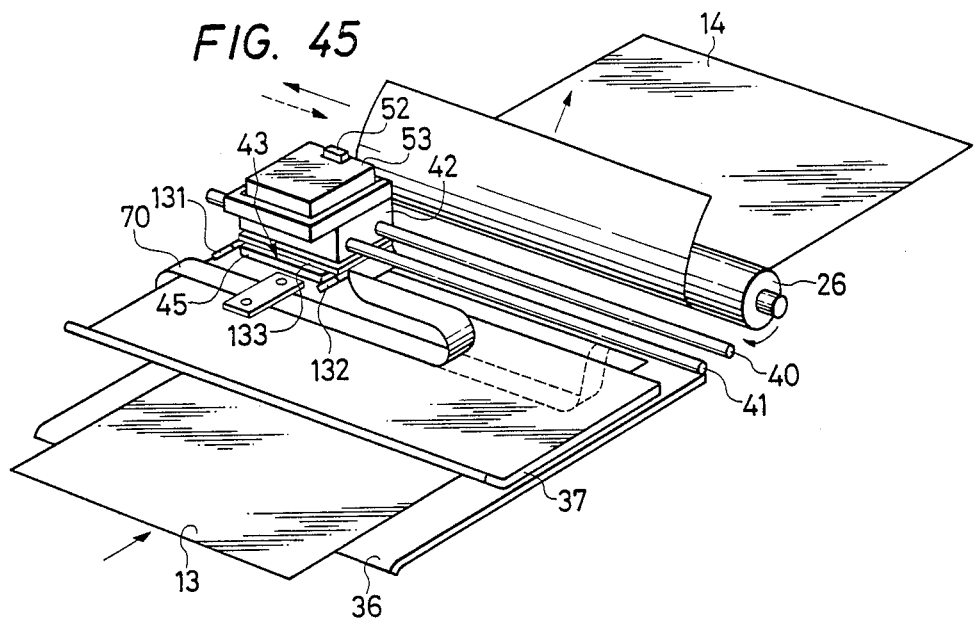
Figure 46:
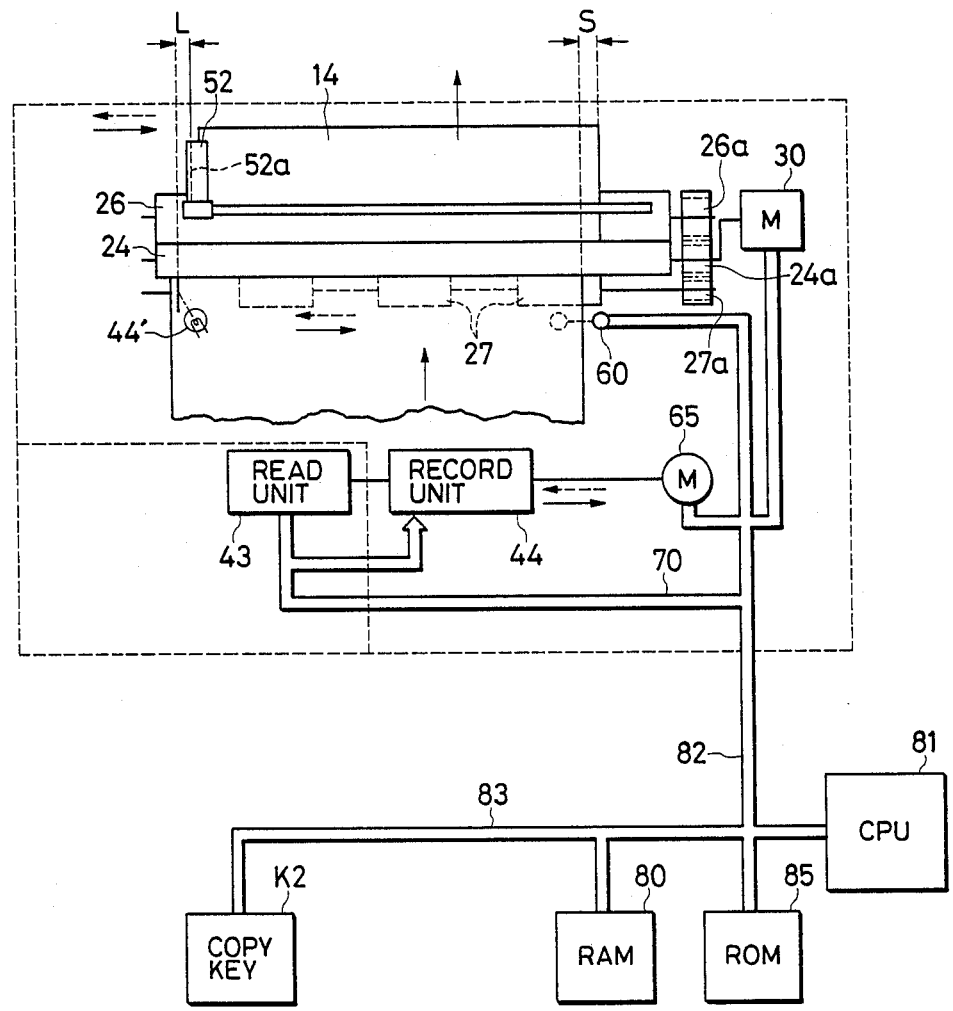

A signal read by the read unit 43 is input to a RAM (Random Access Memory) 80 through a signal cable 70, and is processed under the control of a CPU (Central Processing Unit) 81, as shown in FIGS. 45 and 46. The CPU 81 receives a signal from a sensor 60 for detecting the presence/absence of the original through a signal cable 82, and controls main scan and sub-scan motors (step motors) 65 and 30 therethrough. Similarly, the CPU 81 is connected to a copy key K2 and a ROM (Read-Only Memory) 85 through a signal cable 83. The record unit 44 is connected to the CPU 81 through the signal cables 70 and 82. The electronic circuit is arranged on a circuit board 90 arranged in a lower portion of the apparatus.

In the main scan direction, the reading and recording operations are performed by a flat portion, and in the sub-scan direction, the original and the recording sheet are fed completely synchronous with each other, thus allowing high-quality image recording. In this embodiment, the feed mechanism for the original and the recording sheet is commonly used as much as possible, thus realizing a thin, compact apparatus. As in the embodiment of the present invention, a shift amount between a reading position on the original image by means of the line sensor 46 of the read unit 43 and an element array 52a of the record head 52 of the record unit 44 can be suppressed to an amount indicated by lines in the sub-scan direction and character L in FIGS. 44 and 46. Since a printed circuit board including a sensor can be arranged adjacent to the lens 45, the thickness of the optical unit with respect to the main scan direction can be reduced.

In this embodiment, the read optical system can be arranged adjacent to the feed rollers 24 and 27, and the read lens 45 is arranged so that its optical axis is substantially perpendicular to the original and does not exceed the level of the record unit, and a mirror arranged at the other end of the lens can change an optical path. The printed circuit board 133 mounting the sensor 46 can be set in a right-angled space adjacent to the record unit.

As can be seen from the above description, according to this embodiment, an original reading means comprises a read lens, the optical axis of which extends in a direction substantially perpendicular to the original surface and which is arranged adjacent to a recording means, a circuit board mounting a read sensor and arranged substantially parallel to the optical axis of the lens, and a photo-electric converting means for guiding a light beam from the read lens onto the read sensor. Therefore, a lens having a relatively large focal depth can be used, and an accurate image can be obtained when read scan is performed in a direction perpendicular to the feeding direction of the original. In addition, the original and the recording sheet can be synchronously fed, and a flat original surface can be read and recorded as high-definition data. As a result, a thin, compact apparatus can be realized, and an image reading/recording apparatus with excellent operability can be obtained.

Figure 47:
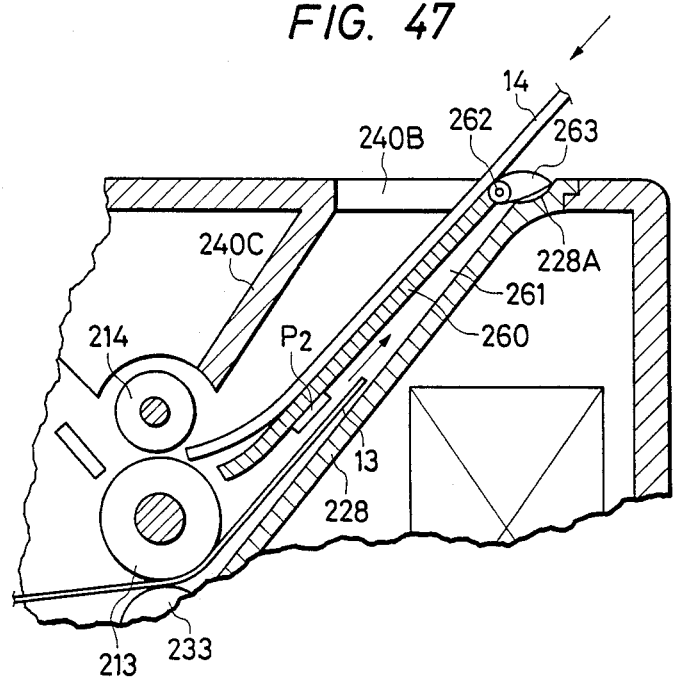
FIGS. 47 and 48 show still another embodiment which is applicable to the recording apparatuses of the above embodiments and are sectional views of an original discharge port and a recording sheet insertion port.

Still another embodiment of the present invention which is applicable to the recording apparatus of the previous embodiments will be described with reference to FIG. 47. FIG. 47 is a sectional view showing a detailed arrangement of an original discharging port and a recording sheet insertion port.

Referring to FIG. 47, an original 13 is inserted from an original insertion port open to the front surface of the recording apparatus to face its image surface upward. The inserted original 13 is moved by a pressing roller in a sub-scan direction, and is discharged by a driving roller 213 and a pressing roller 233 arranged therebelow, from an original discharging port 261 (FIG. 47) formed in the upper surface of the recording apparatus and adjacent to the rear portion of a recording sheet insertion port, through a feed path defined by a common guide plate 260 and a lower guide plate 228. In this case, a plurality of pawl members 263, which are pivotal about a shaft 262 are arranged near an upper entrance of the common guide plate 260 in the widthwise direction of a recording sheet. The pawl members 263 are normally biased clockwise by their weight, and are fitted in recess portions 228A formed in the lower guide plate 228 to close the original discharging port 261, thus preventing insertion or entrance of a recording sheet 14. More specifically, the pawl members 263 are pivotable only in the original discharging direction. When the original is discharged, the distal end of the original pivots the pawl members 263 counterclockwise against their weight, thus allowing the original to be discharged. In this case, in order to improve a recording sheet insertion preventive effect, the pawl members 263 can be positively biased clockwise by a weak spring (not shown).

When a recording sheet 14 is inserted onto the common guide plate 260 through an insertion port 240B and a detector P2 detects the presence of the sheet, the driving roller 213 is pivoted, so that the distal end of the recording sheet 14 is fed to a position above the recording elements of a record head. At this time, the pawl members 263 are fitted in the recess portions 228A of the lower guide plate 228 by their weight or by the basing force of the spring to close the original dischargis delayed from the reading operation by a scanning time corresponding to the shift amount L2. In this case, an image memory which can store read image data corresponding to the shift amount L2 is used, so that the image data of the shift amount L2 is temporarily stored in the image memory, and a recording signal of this image data is supplied to the record head after scanning of the shift amount L2. With this method, an image memory having a very small capacity for storing read image data corresponding to the shift amount L2 can be used to simultaneously perform the reading and recording operations.

More specifically, in this embodiment, the record head 52 is a thermal head for thermal transfer recording on which heating elements 52a having a predetermined number of dots are aligned in the sub-scan direction. The heating elements 52a are urged against the surface of the recording sheet 14 to be inclined through several degrees so that the elements 52a satisfactorily contact the surface of the recording sheet 14 and a high transfer efficiency is obtained. As shown in FIGS. 41 and 42, a cassette 130 for storing a thermal transfer ink ribbon used by the record head 52 is mounted on a carriage 42.

The read unit 43 and the record head 52 are arranged to be shifted along the main scan direction (indicated by arrow X), as shown in FIGS. 41 and 42. The reading position of a lens 152 of the read unit 43 is shifted from the recording position of the heating elements 52a of the record head 52 by the distance L1 or L2 in the main scan direction. The distance L1 or L2 is preferably reduced as small as possible. For this purpose, the record head 52 is arranged at the end portion of the carriage 42 at the upstream side (at the side for starting scanning) or at the downstream side (at the side having been subjected to scanning) in the main scan direction, and the lens 152 is arranged at the nearest position thereof. The lens 152 can advantageously comprise a cylindrical lens or a SELFOC lens (tradename of Nippon Sheet Glass Co., Ltd.). With this arrangement, the shift amounts L1 and L2 can be set to be 10 to 20 mm.

As can be seen from the above description, according to this embodiment, a reading means and a recording means are integrally arranged to be shifted in the main scan direction, so that a reading operation from near the distal end of an original and a recording operation from near the distal end of a recording medium can be performed at the same time. The original and the recording medium are shifted in the main scan direction in correspondence with the shift amount between the reading and recording means. Therefore, the reading and recording operations can be performed at the same time without using an image memory.

Alternatively, the image reading means and the recording means are arranged to be shifted from each other, and the recording operation is delayed from the recording operation by a scanning time corresponding to a shift amount in the main scan direction between the reading and recording positions of the reading and recording means. With this arrangement, an image memory having a very small capacity corresponding to the shift amount can be used, so that the reading and recording operations are performed at the same time while the edges of the original and the recording sheet coincide with each other in the main scan direction.

Still another embodiment of the present invention will now be described with reference to FIGS. 43 to 46.

In this embodiment, an image reading/recording apparatus which scans an original image in the main scan and sub-scan directions to read and record the image, comprises: a reading means, having a read optical system, for reading an original image; a recording means for recording image data read by the reading means onto a recording medium; and a means for integrally moving the reading means and the recording means in the main scan direction. The reading means comprises a reading lens, the optical axis of which extends in a direction substantially perpendicular to an original surface and which is arranged adjacent to the recording means; a circuit board, mounting a read sensor and arranged substantially parallel to the optical axis of the lens; and a photo-electric converting means for guiding a light beam from the reading lens onto the read sensor. With this arrangement, an original is sequentially read in the main scan and sub-scan directions to record an image on a recording sheet. At this time, a difference in function widths necessary for the reading and recording operations in the main scan direction can be minimized by a minimum integral size, and a guide rail length for carriage movement need not be prolonged in the main scan direction. This is because a printed circuit board for mounting a read sensor can be arranged on a parallel plane with respect to the optical axis of the lens, and a sensor clock circuit, an amplifier, and the like can be mounted on a common printed circuit board.

The focal length of the optical system necessary for focusing can be increased by a distance obtained by changing an optical axis and hence a focal depth can also be increased. Therefore, the image reading operation and optical adjustment are facilitated, and an accurate image reading operation can be performed by a simple arrangement. In addition, a printed circuit board mounting a necessary circuit can be arranged adjacent to a circuit board mounting the read sensor, thus protecting a sensor output from being influenced by noise after the original reading operation.

Read and record units of this embodiment will be described with reference to the sectional view of the internal arrangement (FIG. 43), the front view thereof (FIG. 44), the perspective view of a carriage (FIG. 45), and a block diagram of a control system (FIG. 46).

Figure 44:
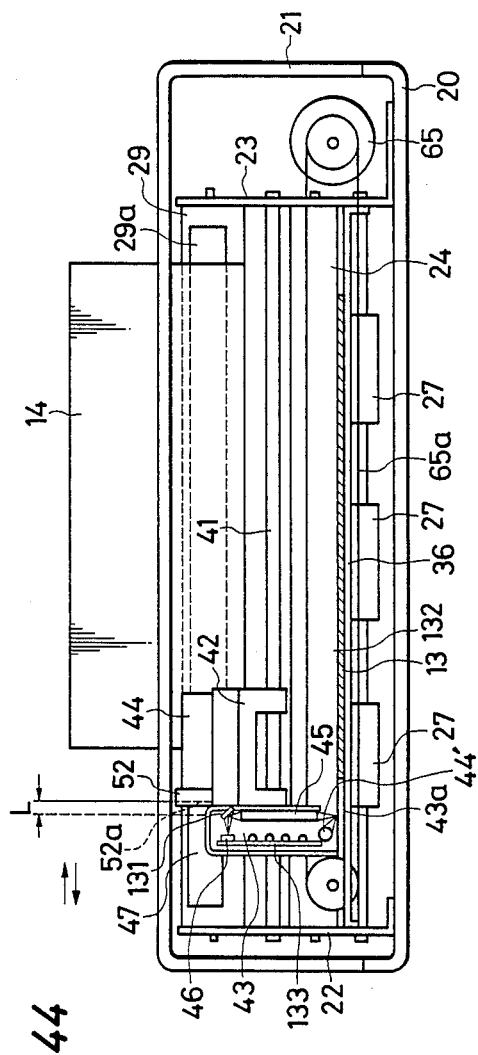

As shown in FIGS. 44 and 45, rails 40 and 41 are fixed between side plates 22 and 23, and a carriage 42 is guided by a main scan motor 65 through a belt 65a along the rails 40 and 41 parallel to a platen roller 26 to be reciprocal in the main scan direction. A read unit 43 for reading and a record unit 44 for recording are mounted on the carriage 42.

As shown in FIG. 44, the read system is constituted as a unit, comprising an original illumination light source 44', a read lens 45, whose optical axis is perpendicular to the original, an optical path changing mirror 131, and a read line sensor 46. Light reflected by the original 13 is reflected by the mirror 131 and is focused on the read line sensor 46. The read pixel surface of the line sensor 46 is directed toward the optical axis direction. The line sensor 46 is mounted on a printed circuit board 133, so that it is parallel to the original surface and is also parallel to the sub-scan direction of the original. The read unit 43 is arranged on the other end portion of the carriage 42 or is slidably mounted on the guide rails for guiding the carriage 42, so that it is movable in the main scan direction together with the record unit 44 and the carriage 42.

Figure 43:
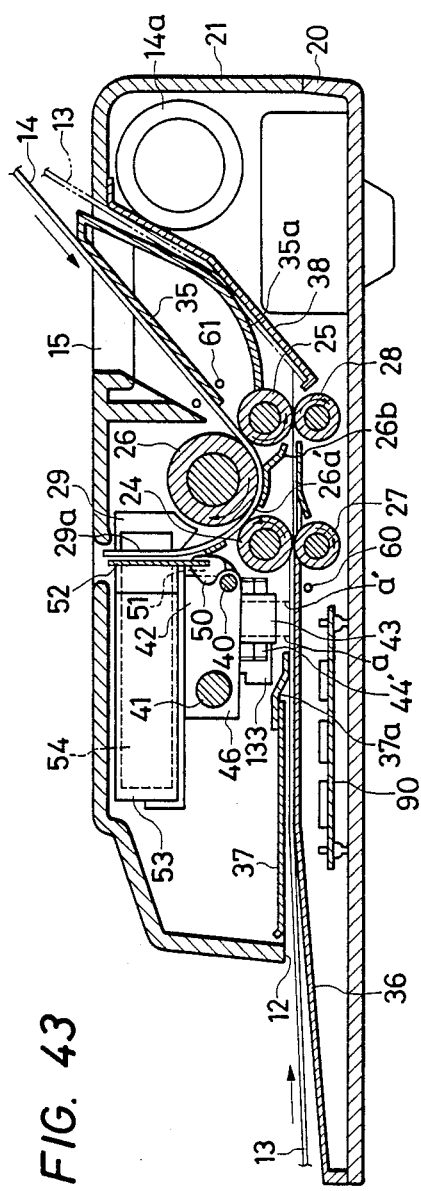

As shown in FIG. 43, an area a—a' of the original 13 in the sub-scan direction having data facing upward is ing port 261. Thus, the recording sheet can be prevented from being erroneously inserted in the original discharging port.

When the reading operation progresses and the rear end of the original 13 passes by a detector, the detector detects the absence of the sheet. A control circuit continues the reading operation until the other end of the original 13 passes by a read position. When the other end of the original passes by the read position, the reading operation is stopped. Meanwhile, the pressing roller 233 and the driving roller 213 are continuously rotated, and the original 13 is discharged through the discharging port 261 formed by the common guide plate 260 and the lower guide plate 228. In this case, when the distal end of the original abuts against the pawl members 263, the pawl members are pivoted counterclockwise, thus allowing the original 13 to be discharged.

Figure 48:
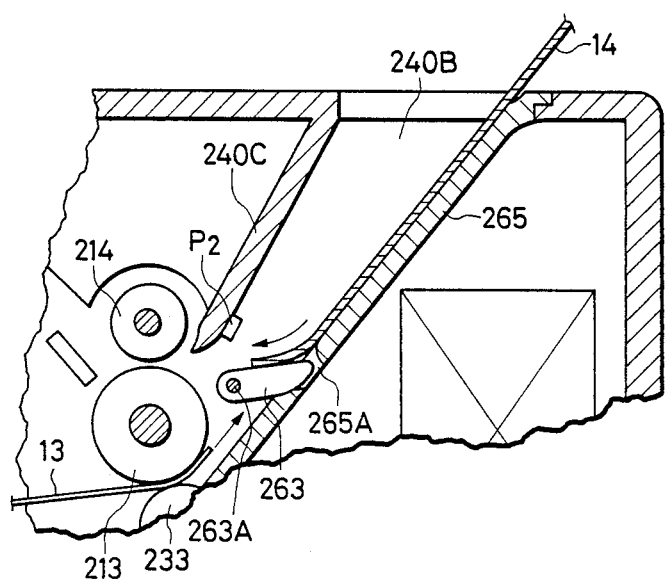

Still another embodiment of the present invention which is applicable to the recording apparatuses of the previous embodiments will be described with reference to FIG. 48. FIG. 48 is a sectional view showing the detailed arrangement of an original discharging port and a recording sheet insertion port.

Referring to FIG. 48, an original 13 is inserted from an original insertion port C formed in the front surface of the recording apparatus to face its image surface upward. The inserted original 13 is moved in the sub-scan direction by a pressing roller, and is discharged to an upper surface of the recording apparatus by a driving roller 213 and a pressing roller 233 arranged therebelow through a common port 240B defined by an upper guide plate 240C and a lower guide plate 265. In this case, a plurality of lightweight pawl members 263 which are pivotable about a shaft 263A are mounted below the common port 240C and adjacent to the driving roller 213 to be parallel to the roller 213. The pawl members 263 are normally biased clockwise by their weight, and are fitted in corresponding recess portions 265A formed in the lower guide plate 265, thus closing an original discharging path. Thus, a recording sheet 14 can be prevented from being inserted in or entering the read side. When an original is to be discharged, the distal end of the original can pivot the pawl members 263 counterclockwise against their weight, so that the original can be discharged to the upper surface of the apparatus through the common port along the lower guide plate 265. In this case, in order to prevent recording sheet insertion error, the pawl members 263 can positively be biased clockwise by a weak spring (not shown).

Still another embodiment of the present invention will now be described.

In this embodiment, the original discharging port shown in FIG. 11 has a narrow path.

In this embodiment, an original discharging port has a narrow path, and is inclined so that an original 13 is discharged backward when viewed from an operator. Thus, erroneous insertion of a recording sheet can be prevented.

As shown in FIG. 49, a narrow original discharging port 35a is formed to be separated from a recording sheet insertion port 15 as far as possible, again preventing erroneous insertion of a recording sheet 14. If the discharging port 35a is inclined backward, the above effect can be further enhanced. The narrow path of the discharging port is preferably a path wide enough to allow stacking of several originals on a tray 38.

As described above, in this embodiment, since the recording sheet insertion port and the original discharging port are formed in the rear portion of the apparatus, an operator can easily operate it. Since the original discharging port is arranged to be separated from the recording sheet insertion port or has a narrow path, a recording sheet can be prevented from being erroneously inserted in the original discharging port, thus allowing a reliable reading/recording operation.

Still another embodiment of the present invention will be described with reference to FIGS. 50 to 52.

In this embodiment, a recording apparatus for recording an image on a recording medium in accordance with data, comprises: a key input means for inputting key data; original reading means for reading original data; recording means for recording the data input by the key input means and the original data read by the original reading means onto the recording medium; and an original insertion port arranged behind the key input means.

With this arrangement, during an original reading operation, an original is inserted from the original insertion port arranged behind the key input means, and is guided to a read unit arranged adjacent thereto. In this manner, the original can be inserted with almost no damage from a portion near the read unit.

Figure 50:
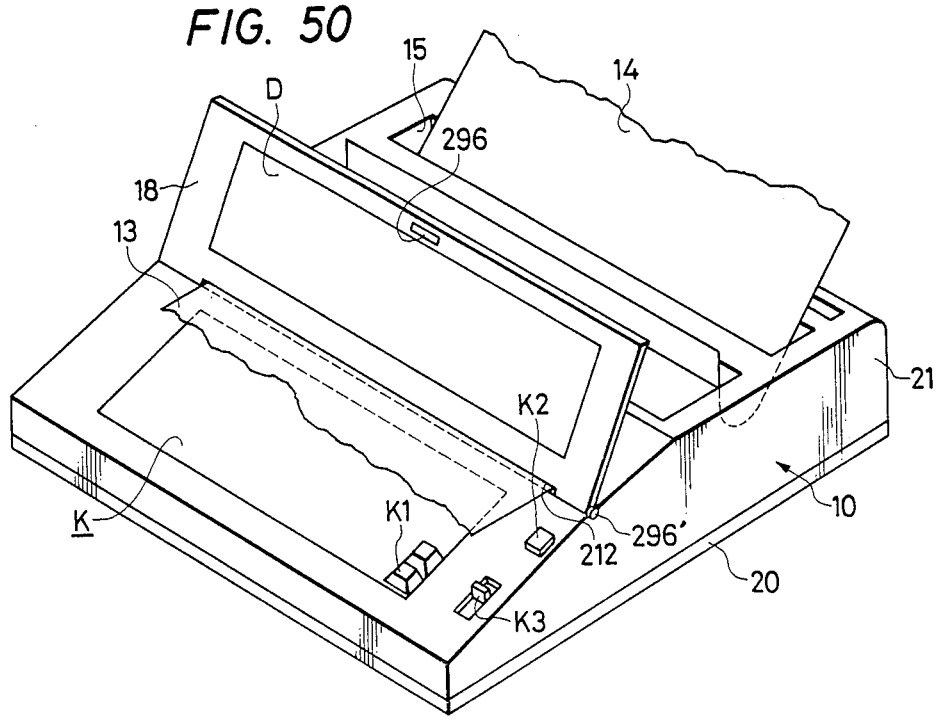

FIG. 50 shows the outer appearance of the recording apparatus according to this embodiment of the present invention. A keyboard K including character keys and function keys K1, a copy key K2, a power source switch K3, and the like is arranged on the front surface portion of a casing 10 of the recording apparatus. As will be described later, the keyboard K is covered with a cover 298 on which a display unit D comprising a liquid-crystal display is arranged opposite to the keyboard K. The cover 298 is pivoted upward about a shaft 296' to be opened by releasing a lock means 296 comprising a magnet or the like. When the original 13 is inserted for the reading operation, the cover 298 is opened upward, and the original 13 is inserted in an original insertion port 212 exposed behind the keyboard K when the cover 298 is open. A recording sheet insertion port 15 for inserting a recording sheet 14 therethrough is formed in the rear end portion of the apparatus.

Figure 52:
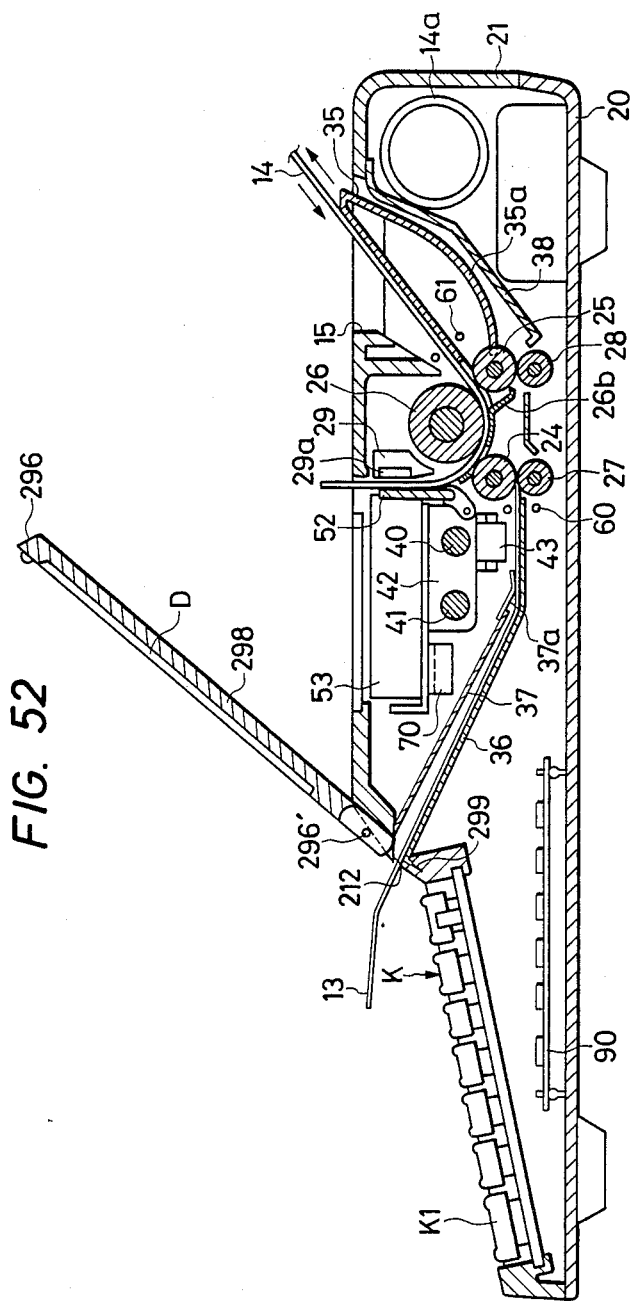

The cover 298 can be opened upward about the shaft 296', as shown in FIGS. 51 and 52. When the cover 298 is open, the large liquid-crystal display unit D as a 12-inch CRT display having a 640×400 dot configuration appears in front of the operator, and the original insertion port 212 is exposed behind the keyboard K. A lower guide plate 236 and an upper guide plate 237 obliquely extend downward from the original insertion port 212, and the lower guide plate 236 reaches near a main roller 24.

Driven rollers 27 and 28 are arranged below main rollers 24 and 25 to be parallel to each other and to keep an urging state necessary for feeding a sheet. As shown in FIG. 51, the original 13 is inserted from the original insertion port 212, and is guided along the guide plates 236 and 237. Then, the original 13 is clamped between the main rollers 24 and 25 and the driven rollers 27 and 28 to be fed substantially horizontally. A gear 24a of the main roller 24 and a gear 27a of the driven roller 27a are meshed with each other so as to feed the original 13 without slipping between the rollers 24 and 27, as shown in FIG. 5B in detail. The original 13 receives a feed force from its back surface through the gear 27a, thus assuring a reliable feed operation.

All the rollers are parallel to each other, and are rotated by a sub-scan motor 30. A flat platen 29 parallel to the platen roller 26 and an elastic rubber member 29a having a flat surface with respect to a record head are integrally supported by side plates 22 and 23 above the platen roller 26.

The original 13 is fed in a direction opposite to the recording sheet 14, and reaches a position below a recording sheet guide member 35. The recording sheet guide member 35 has a notch portion 26a' at its lower portion, and the rollers 24 and 26 can be in contact with each other through the notch portion 26a'. The notch portion is bent downward to serve as a bent portion 26b and also serve as a guide portion for guiding the original between the next rollers 25 and 28. The original 13 guided by the upper and lower guide plates 237 and 236 is clamped by the rollers 24 and 27 and the rollers 25 and 28 to be guided along a bent portion 26a of the guide member 35, and is then stocked on a tray 38, as indicated by the dotted line in FIG. 51.

Note that the original 13 can be discharged upward but can be guided to the rear portion. A weak spring 237a which does not interfere with entrance of the original is arranged on the upper guide plate 237 in order to guide the original along the tangents of the rollers 24 and 27 without floating.

A magnetic member 299, e.g., a magnetic sheet or plate is arranged near the original insertion port 212 in the widthwise direction of the sheet, so that a metallic clip, pin, or staple of a stapler attached to the original is attracted thereby to be prevented from entering the apparatus upon insertion of the original.

A sensor 60 for detecting the presence/absence of the original 13 is arranged at the distal end portion of the lower guide plate 236, and a sensor 61 for detecting the presence/absence of the recording sheet 14 is arranged at the lower portion of the recording sheet guide member 35. These sensors can be realized by mechanical sensors, e.g., a microswitch or photosensors, e.g., a photointerrupter.

A typewriter function of the recording apparatus of this invention with the above arrangement will now be described.

As shown in FIG. 51, the cover 298 is opened upward by releasing the lock means 296 to expose the keyboard K. The recording sheet 14 is then inserted between the platen roller 26 and the main roller 25 serving as a first carrier from the recording sheet insertion port 15 formed in the upper rear portion of the apparatus. When the rollers are rotated in the direction indicated by arrow by a rotary knob (not shown), the recording sheet is moved in a path defined between the platen roller 26 and the bent portion 26b in a U-turn manner through the platen roller 26 and the main roller 24, and is guided along a guide member extending forward. Then, the recording sheet passes through a gap between the record head 52 and the flat platen 29 to be discharged outside the apparatus. The following operation is the same as the previous embodiments.

A copying function, i.e., an original reading/recording operation, will be described.

The distal end of the recording sheet 14 is set at a specified position beyond the record head 52 by the rotary knob in the same manner as in the typewriter function, and the original 13 is set, as shown in step S4.

When the original is set, the cover 298 is manually opened upward by releasing the lock means 296. At this time, since the original insertion port 212 is exposed behind the keyboard K, the original is inserted through the insertion port.

The original 13 is manually inserted to a read enable area of a read optical system to face its character data surface upward along the guide plates 236 and 237, until it abuts against between the rollers 24 and 27. This position is detected by the sensor 60. The distance from one end a' of a prospective optical read length a—a' (FIGS. 6 and 15A) for reading the original to the distal end of the original 13 is preferably equal to the distance from the distal end of the recording sheet 14 to a dot start point of the record head 52.

In this manner, when insertion of the original 13 is detected by the sensor 60, a circuit operated when an original is present is selected, and the reading operation can be started. The record unit is automatically switched to a copying mode, and is in a state as shown in FIG. 5A. The following control operation is performed in the same manner as in the previous embodiments.

In this manner, as shown in FIG. 51, when the cover 298 is opened upward, the display unit D is located at a position easy to see, resulting in convenience. The original insertion port 212 is arranged behind the keyboard K to shorten an original feed path. Since the magnetic member 299, e.g., a magnetic sheet or plate, is arranged near the outside of the original insertion port 12, a metallic paper clip, pin, or staple of a stapler can be prevented from entering the apparatus, thus preventing a trouble of the apparatus.

After a series of operations, the cover 298 is returned to an original position, as shown in FIG. 52, so that the keyboard K and the original insertion port 212 are not exposed, thus protecting them from an erroneous operation or damage.

According to this embodiment as described above, an original can be inserted from behind a key input means, e.g., a keyboard, and a distance from an insertion port to an original read unit can be shortened. Thus, the original can be prevented from being damaged during the feed operation, and the original can be reliably fed to the read unit. Therefore, a satisfactory recording operation can be realized, and a compact recording apparatus with excellent operability can be obtained.

As described above, according to the present invention, a compact recording apparatus which has a function for reading data on an original and a function for recording an image in accordance with read data and can obtain a sharp image can be provided.

What is claimed is:

1. A recording apparatus for reading an original image of an original and recording an image in accordance with the original image onto a recording medium, said apparatus comprising:
   original reading means for reading the original image;
   recording means for recording an image ready by said original reading means in accordance with the original image;
   means for reciprocally and integrally moving said original reading means in a direction crossing a conveyance path of said original and said recording means in a direction crossing a conveyance path of the recording medium; and
   common conveying means for commonly and simultaneously conveying the original along said original conveyance path and the recording medium along said recording medium conveyance path by synchronizing the original with the recording medium.

2. An apparatus according to claim 1, wherein a space in which the original and the recording medium are moved in opposite directions is formed adjacent to said common conveying means, and reading and recording operations are performed in said space.

3. An apparatus according to claim 1, wherein said original reading means and said recording means are respectively arranged at upstream and downstream sides in a main scan direction in the vicinity of said common conveying means.

4. An apparatus according to claim 1, wherein said original reading means and said recording means are both arranged on one carriage.

5. A recording apparatus for recording an image corresponding to data on a recording medium, comprising:
- key input means for inputting data in accordance with a key input;
- original reading means for reading data on an original surface of an original;
- recording means for recording an image on the recording medium in accordance with data input by said key input means and data read by said original reading means; and
- a feed path, arranged below said key input means, for feeding an original, the original surface of which is read by said original reading means.

6. An apparatus according to claim 5, wherein the original is inserted from a front side, side, or lower side of said key input means.

7. A recording apparatus for recording an image corresponding to data on a recording medium, comprising:
- key input means for inputting data corresponding to a key input;
- original reading means for reading data on an original surface of an original;
- recording means for recording an image on the recording medium in accordance with data input by said key input means and data read by said original reading means; and
- a feed path, arranged below said key input means, for feeding an original, the original surface of which is read by said original reading means, wherein said key input means is openable upward upon insertion of the original.

8. A recording apparatus for recording an image corresponding to data on a recording medium, comprising:
- key input means, openable upward upon insertion of an original, for inputting data corresponding to a key input;
- original reading means for reading original data;
- recording means for recording an image on the recording medium in accordance with data input by said key input means and data read by said original reading means;
- feeding means for feeding the original to be read by said original reading means; and
- positioning means for positioning the original at a predetermined position, wherein said positioning means is moved within an original feed path to be interlocked with an opening operation of said key input means.

9. An apparatus according to claim 8, wherein an urging state of said feeding means is canceled when said key input means is opened.

10. An apparatus according to claim 8, wherein when said key input means is closed after the original is set at the predetermined position, feeding and reading operations of the original are enabled.

11. An image reading apparatus for reading an original image of an original, comprising:
- an optical system for imaging a reflected optical image of the original;
- a reading sensor for reading the optical image imaged by said optical system;
- moving means for integrally moving said optical system and said reading sensor to read the original image; and
- following means for following movement of said optical system caused by said moving means to move said system along, ant at a predetermined distance from, and original surface on which the original is read.

12. An apparatus according to claim 11, wherein said following means has a rotatable roller which is in contact with the original surface or a transparent plate surface contacting an original.

13. A recording apparatus for reading an original image of an original and recording an image in accordance with the original image on a recording medium, said apparatus comprising:
- original reading means for reading the original image;
- recording means for recording an image read by said original reading means in accordance with the original image;
- means for reciprocally and integrally moving said original reading means in a direction crossing a conveyance path of the original and said recording means in a direction crossing a conveyance path of the recording medium; and
- holding means for holding said original reading means and said recording means offset relative to each other a predetermined amount in a reciprocal moving direction of said moving means.

14. An apparatus according to claim 13, wherein said original reading means and said recording means are arranged to be offset in a main scan direction, and recording operation of said recording means is delayed by a scanning time corresponding to the predetermined amount.

15. An apparatus according to claim 13, further comprising a memory for storing a read signal during the scanning time corresponding to the predetermined amount.

16. A recording apparatus for reading an original image and recording an image in accordance with the original image onto a recording medium, said apparatus comprising:
- original reading means for reading the original image;
- recording means for recording an image read by said original reading means in accordance with the original image; and
- means for reciprocally moving said original reading means in a direction crossing a conveying path of the original and said recording means in a direction crossing a conveyance path of the recording medium,
- wherein said original reading means comprises a board which mounts a reading lens, an optical axis of which extends in a direction substantially perpendicular to an original surface and which is arranged adjacent to said recording means, and a reading sensor, and which is arranged substantially parallel to the optical axis of said reading lens; and optical path changing means for guiding a light from said reading lens onto said reading sensor.

17. An apparatus according to claim 16, wherein said reading lens is a focusing lens, and said board mounting said reading sensor extends downward from the vicinity of said recording means and a recording sheet in a direction diverging therefrom.

18. An apparatus according to claim 16, wherein the original surface and a recording surface of said recording means are arranged to be substantially orthogonal to each other, and said reading means and said recording means are arranged in an orthogonal space.

19. An apparatus according to claim 16, wherein the original and the recording medium are synchronously and intermittently fed in opposite directions.

20. An apparatus according to claim 1, wherein a discharging part for discharging the original has a pawl member which is pivotal only in a discharging direction.

21. A recording apparatus comprising:
original reading means for reading data on an original;
recording means for recording an image corresponding to the data read by said original reading means on a recording medium;
means for reciprocating said original reading means and said recording means in a main scan direction;
common feeding means for synchronously feeding the original and the recording medium in a sub-scan direction;
wherein said original reading means and said recording means are moved in the main scan direction, and the original and the recording medium are synchronously fed in the sub-scan direction to record an image corresponding to the data on the original on a recording medium; and
a common port used both as an insertion port for inserting the recording medium and a discharging port for discharging the original; and
means which guides the recording medium inserted through said common port toward said recording means, and the original which has been subjected to the reading operation and is to be discharged toward said common port.

22. A recording apparatus comprising:
original reading means for reading data on an original;
recording means for recording an image corresponding to the data read by said original reading means on a recording medium;
means for reciprocating said original reading means and said recording means in a main scan direction; and
common feeding means for synchronously feeding the original and the recording medium in a sub-scan direction,
wherein said original reading means and said recording means are moved in the main scan direction, and the original and the recording medium are synchronously fed in the sub-scan direction to record an image corresponding to the data on the original on a recording medium,
wherein an insertion port for inserting the recording medium and a discharging port for discharging the original are arranged in a rear portion of said apparatus and are separated by a predetermined distance, or an original discharging port has a narrow path.

23. A recording apparatus for recording an image corresponding to data on a recording medium, comprising:
key input means for inputting key data;
original reading means for reading original data;
recording means for recording the data input by said key input means and data read by said original reading means onto the recording medium; and
an original insertion port arranged behind said key input means.

24. An apparatus according to claim 23, wherein a display unit for displaying data input by said key input means is arranged to be openable/closable, and said original insertion port is exposed or closed upon opening/closing operation of said display unit.

25. An apparatus according to claim 23, wherein a magnetic member is arranged adjacent to the original insertion port.

* * * * *

UNITED STATES PATENT AND TRADEMARK OFFICE
CERTIFICATE OF CORRECTION

PATENT NO. : 4,823,195
DATED : April 18, 1989
INVENTOR(S) : YOSHIO ITO

It is certified that error appears in the above-identified patent and that said Letters Patent is hereby corrected as shown below:

COLUMN 1

Line 20, "it" should be deleted.

COLUMN 2

Line 30, "path." should read --path--.

COLUMN 4

Line 28, "perspective" should read --perspective view--.

COLUMN 6

Line 58, "an" should read --a--.

COLUMN 10

Line 62, "cessor an" should read --cessor, an--.

COLUMN 11

Line 55, "to" should read --on--.
    Line 56, "thus" should read --for--.
    Line 57, "excessively fed," should read --fed excessively far,--.

UNITED STATES PATENT AND TRADEMARK OFFICE
CERTIFICATE OF CORRECTION

PATENT NO. : 4,823,195
DATED : April 18, 1989
INVENTOR(S) : YOSHIO ITO

It is certified that error appears in the above-identified patent and that said Letters Patent is hereby corrected as shown below:

COLUMN 12

Line 3, "presence/absence" should read --presence or absence--.
Line 13, "operation errors during" should read --any operation errors which may have occurred during--.
Line 23, "aligned in" should read --arranged in a--.
Line 30, "checking" should read --checking of-- and "correcting" should read --correction of--.
Line 31, "displayed" should read --the displayed--.
Line 57, "24 dots vertical elements or more" should read --24 or more dots along vertical element--.
Line 62, "Upon utiliz-" should read --During--.
Line 63, "ing of this" should read --this--.

COLUMN 13

Line 1, "a" should read --the--.
Line 19, "the" (third occurrence) should be deleted.
Line 20, "similar recording operation" should read --recording operation similar--.
Line 25, "operation" should read --operation,--.
Line 36, "a distance" should read --the distance--.
Line 38, "is" should read --be--.
Line 39, "a distance" should read --the distance--.
Line 40, "a dot" should read --the dot--.

UNITED STATES PATENT AND TRADEMARK OFFICE
CERTIFICATE OF CORRECTION

PATENT NO. : 4,823,195
DATED : April 18, 1989
INVENTOR(S) : YOSHIO ITO

Page 3 of 8

It is certified that error appears in the above-identified patent and that said Letters Patent is hereby corrected as shown below:

COLUMN 14

Line 10, "it" should read --at--.
Line 21, "error," should read --error--.
Line 22, "a" should read --the--.
Line 23, "sheet 14" should read --sheet 14,--.
Line 24, "mode" should read --mode,--.
Line 27, "because" should read --because,--.
Line 32, "a line" should read --the line--.
Line 49, "perform the" should read --permit the operations of-- and "operation of" should be deleted.
Line 50, "original at" should read --original to be performed at--.
Line 64, "function" should read --function,--.

COLUMN 15

Line 3, "having long histories have been designed" should read --have a long history of being designed--.
Line 4, "in terms of the human" should read --in consideration of the mechanical factors in human-- and "technology," should read --use of the technology,--.
Line 7, "an" should be deleted.
Line 8, "wordprocessors," should read --word processors,--.

UNITED STATES PATENT AND TRADEMARK OFFICE
CERTIFICATE OF CORRECTION

PATENT NO. : 4,823,195

DATED : April 18, 1989

INVENTOR(S) : YOSHIO ITO

It is certified that error appears in the above-identified patent and that said Letters Patent is hereby corrected as shown below:

COLUMN 15

Line 10, "edit" should read --editing--.
    Line 20, "an" should be deleted.
    Line 57, "The original hav-" should read --A very long--.
    Line 58, "ing a large length in its longitudinal direction" should read --original--.
    Line 62, "small-sized" should read --small--.
    Line 63, "can be" should be deleted.

COLUMN 16

Line 12, "satisfactorily" should read --satisfactory--.
    Line 20, "a" should be deleted.
    Line 21, "opera-" should be deleted.
    Line 22, "tion" should be deleted.
    Line 24, "open" should read --opening--.
    Line 28, "perform" should read --insert-- and "insertion operation" should be deleted, and "the" should be deleted.
    Line 29, "operation" should be deleted.
    Line 33, "a" should be deleted and "and" should read --and only--.
    Line 36, "the" (first occurrence) should read --this--.
    Line 43, "13." should read --13--.

UNITED STATES PATENT AND TRADEMARK OFFICE
CERTIFICATE OF CORRECTION

PATENT NO. : 4,823,195
DATED : April 18, 1989
INVENTOR(S) : YOSHIO ITO

Page 5 of 8

It is certified that error appears in the above-identified patent and that said Letters Patent is hereby corrected as shown below:

COLUMN 17

Line 63, "as the next opera-" should be deleted.
    Line 64, "tions" should be deleted and "can" should read --can at once--.

COLUMN 18

Line 3, "perform an original insertion" should read --insert an original--.
    Line 4, "operation for its reading operation." should read --for reading.--.
    Line 61, "Fig. 8." should read --Fig. 28.--.

COLUMN 21

Line 1, "pivotal" should read --pivotable--.
    Line 13, "to a sum" should read --to the sum--.
    Line 52, "read" should read --reading--.

COLUMN 22

Line 16, "to have the" should read --but has--.
    Line 18, "creased" should read --creased,--.
    Line 24, "comprises" should read --comprise--.
    Line 54, "pivotal" should read --pivotable--.

UNITED STATES PATENT AND TRADEMARK OFFICE
CERTIFICATE OF CORRECTION

PATENT NO. : 4,823,195
DATED : April 18, 1989
INVENTOR(S) : YOSHIO ITO

It is certified that error appears in the above-identified patent and that said Letters Patent is hereby corrected as shown below:

COLUMN 24

Line 1, "a" should read --the--.
Line 2, "difference" should read --differences--.
Line 10, "shifted" should read --shifted or offset relative to each other--.
Line 12, "amount" should read --or offset amount--.
Line 14, "a" should read --the--.
Line 47, "with reading" should read --and reading,--.
Line 50, "reversed to" should read --reversed with respect to--.

COLUMN 25

Line 15, "52a" should read --52a,--.
Line 16, "dots" should read --dots,--.

COLUMN 26

Line 11, "read" should read --reading--.
Line 20, "by" should read --to--.
Line 30, "a" should read --the--.
Line 53, "read lens 45," should read --reading lens 45,--.
Line 55, "read line sensor 46." should read --reading line sensor 46.--.
Line 57, "read line sensor 46." should read --reading line sensor 46.--.

UNITED STATES PATENT AND TRADEMARK OFFICE
CERTIFICATE OF CORRECTION

PATENT NO. : 4,823,195

DATED : April 18, 1989

INVENTOR(S) : YOSHIO ITO

It is certified that error appears in the above-identified patent and that said Letters Patent is hereby corrected as shown below:

COLUMN 27

Line 40, "presence/absence" should read --presence or absence--.
Line 52, "synchronous" should read --synchronously--.
Line 56, "As in the" should read --As in one of the--.
Line 61, "suppressed" should read --held--.

COLUMN 28

Line 9, "read" should read --reading--.
Line 12, "read" should read --reading--.
Line 15, "read" (both occurrences) should read --reading--.
Line 18, "when read" should read --when a reading--.
Line 56, "a" should read --the pawl members effect of preventing--.
Line 57, "preventive effect" should be deleted.

COLUMN 30

Line 4, "or" should read --, and--.

COLUMN 31

Line 31, "presence/absence" should read --presence or absence--.
Line 34, "presence/absence" should read --presence or absence--.

UNITED STATES PATENT AND TRADEMARK OFFICE
CERTIFICATE OF CORRECTION

PATENT NO. : 4,823,195
DATED : April 18, 1989
INVENTOR(S) : YOSHIO ITO

It is certified that error appears in the above-identified patent and that said Letters Patent is hereby corrected as shown below:

COLUMN 32

Line 27, "a" should be deleted.
    Line 28, "trouble of" should read --problem with--.
    Line 32, "an" should be deleted.
    Line 55, "ready" should read --read--.

COLUMN 34

Line 16, "ant" should read --and--.
    Line 17, "and" should read --an--.

COLUMN 35

Line 19, "part" should read --port--.

Signed and Sealed this

Fourteenth Day of January, 1992

Attest:

HARRY F. MANBECK, JR.

*Attesting Officer*      *Commissioner of Patents and Trademarks*